United States Patent
Kodama et al.

(10) Patent No.: US 9,868,846 B2
(45) Date of Patent: Jan. 16, 2018

(54) CURABLE COMPOSITION FOR IMPRINTS, PATTERNING METHOD AND PATTERN

(71) Applicant: FUJIFILM Corporation, Minato-ku, Tokyo (JP)

(72) Inventors: Kunihiko Kodama, Haibara-gun (JP); Yuichiro Enomoto, Haibara-gun (JP); Kazuyuki Usuki, Haibara-gun (JP); Tadashi Omatsu, Haibara-gun (JP); Hirotaka Kitagawa, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 449 days.

(21) Appl. No.: 14/151,367

(22) Filed: Jan. 9, 2014

(65) Prior Publication Data

US 2014/0154471 A1 Jun. 5, 2014

Related U.S. Application Data

(63) Continuation of application No. PCT/JP2012/068036, filed on Jul. 9, 2012.

(60) Provisional application No. 61/507,818, filed on Jul. 14, 2011.

(30) Foreign Application Priority Data

Jul. 12, 2011 (JP) ................................ 2011-153468
May 16, 2012 (JP) ................................ 2012-112278

(51) Int. Cl.
| | | |
|---|---|---|
| *C08K 5/053* | (2006.01) | |
| *C08F 220/22* | (2006.01) | |
| *C08F 222/10* | (2006.01) | |
| *G11B 5/855* | (2006.01) | |
| *B29C 59/00* | (2006.01) | |
| *C08F 2/48* | (2006.01) | |
| *C08F 220/10* | (2006.01) | |
| *C09D 4/06* | (2006.01) | |
| *C08F 2/46* | (2006.01) | |
| *C08F 220/18* | (2006.01) | |
| *C08F 230/08* | (2006.01) | |
| *C08F 220/38* | (2006.01) | |

(52) U.S. Cl.
CPC ............ *C08K 5/053* (2013.01); *B29C 59/005* (2013.01); *C08F 2/46* (2013.01); *C08F 2/48* (2013.01); *C08F 220/10* (2013.01); *C08F 222/1006* (2013.01); *C09D 4/06* (2013.01); *G11B 5/855* (2013.01); *C08F 220/22* (2013.01); *C08F 230/08* (2013.01); *C08F 2220/185* (2013.01); *C08F 2220/1833* (2013.01); *C08F 2220/1875* (2013.01); *C08F 2220/1891* (2013.01); *C08F 2220/382* (2013.01); *C08F 2222/102* (2013.01); *C08F 2222/1013* (2013.01); *Y10T 428/24479* (2015.01)

(58) Field of Classification Search
CPC .. C08K 5/00; C08K 5/04; C08K 5/053; B29C 59/005; C08F 2/48; C08F 2/50; C09D 4/00; C09D 4/06; G11B 5/855; Y10T 428/24479
See application file for complete search history.

(56) References Cited

U.S. PATENT DOCUMENTS

| | | | |
|---|---|---|---|
| 4,377,679 A | 3/1983 | Schmidle | |
| 4,391,686 A | 7/1983 | Miller et al. | |
| 5,032,108 A | 7/1991 | Taniguchi et al. | |
| 5,169,965 A | 12/1992 | Fujiwa et al. | |
| 5,198,509 A | 3/1993 | Fujiwa et al. | |
| 5,259,926 A | 11/1993 | Kuwabara et al. | |
| 5,338,879 A | 8/1994 | Fujiwa et al. | |
| 5,378,736 A | 1/1995 | Fujiwa et al. | |
| 5,772,905 A | 6/1998 | Chou | |
| 5,956,216 A | 9/1999 | Chou et al. | |
| 7,198,968 B2 | 4/2007 | Chae et al. | |
| 7,821,586 B2 | 10/2010 | Kim | |
| 7,883,826 B2 * | 2/2011 | Beckley | B41C 1/1008 430/270.1 |
| 8,859,221 B2 * | 10/2014 | Abe | C12Q 1/60 435/11 |
| 2005/0142714 A1 | 6/2005 | Chae et al. | |
| 2005/0231669 A1 | 10/2005 | Kim | |
| 2008/0138741 A1 * | 6/2008 | Beckley | B41C 1/1008 430/281.1 |

(Continued)

FOREIGN PATENT DOCUMENTS

| | | |
|---|---|---|
| EP | 1 182 033 A1 | 2/2002 |
| JP | 11-100378 A | 4/1999 |

(Continued)

OTHER PUBLICATIONS

Office Action dated Mar. 22, 2016 from the State Intellectual Property Office of the P.R.C. in counterpart Chinese Application No. 201280034131.0.
Extended European Search Report (EESR) dated Apr. 30, 2015, issued by the European Patent Office in counterpart European Application No. 12811906.2.
Office Action dated Sep. 25, 2015 from the Taiwanese Intellectual Property Office issued in corresponding Taiwanese Application No. 101125123.

(Continued)

*Primary Examiner* — Sanza McClendon
(74) *Attorney, Agent, or Firm* — Sughrue Mion, PLLC

(57) ABSTRACT

Disclosed is a to provide a curable composition for imprints capable of keeping a good patternability and of producing less defects even after repetitive pattern transfer. The curable composition for imprints comprising: a polymerizable compound (A);
a photo-polymerization initiator (B); and a non-polymerizable compound (C) having a polyalkylene glycol structure having at least one terminal hydroxy group, or at least one etherified terminal hydroxy group, and containing substantially no fluorine atom and no silicon atom.

20 Claims, No Drawings

(56) References Cited

U.S. PATENT DOCUMENTS

| | | | | |
|---|---|---|---|---|
| 2010/0009137 A1* | 1/2010 | Kodama | ............... | B82Y 10/00 428/195.1 |
| 2013/0052431 A1* | 2/2013 | Enomoto | ............. | C09D 133/16 428/195.1 |
| 2014/0121292 A1* | 5/2014 | Kodama | ................ | C09D 4/00 522/64 |

FOREIGN PATENT DOCUMENTS

| | | | |
|---|---|---|---|
| JP | 2926262 | B2 | 5/1999 |
| JP | 2906245 | B2 | 6/1999 |
| JP | 2004-240241 | A | 8/2004 |
| JP | 2005-84561 | A | 3/2005 |
| JP | 2005-197699 | A | 7/2005 |
| JP | 2005-301289 | A | 10/2005 |
| JP | 2008-105414 | A | 5/2008 |
| JP | 2008-246864 | A | 10/2008 |
| JP | 2009-073078 | A | 4/2009 |
| JP | 2010-18666 | A | 1/2010 |
| JP | 2010-511914 | A | 4/2010 |
| JP | 2010-105210 | A | 5/2010 |
| JP | 2010-258026 | A | 11/2010 |
| JP | 2010-287829 | A | 12/2010 |
| WO | 2005/000552 | A2 | 1/2005 |
| WO | WO 2010064726 | A2 * | 6/2010 ............. B82Y 10/00 |

OTHER PUBLICATIONS

Office Action dated Sep. 1, 2015 from the Korean Intellectual Property Office issued in corresponding Korean Application No. 10-2014-7003547.

Office Action dated Aug. 14, 2015 from the State Intellectual Property Office of People's Republic of China issued in corresponding Chinese Application No. 201280034131.0.

Stephen Y. Chou, et al., "Imprint of sub-25 nm vias and trenches in polymers", Appl. Phys. Lett., Nov. 20, 1995, pp. 3114-3116, vol. 67, No. 21.

M. Colburn, et al., "Step and Flash Imprint Lithography: A New Approach to High-Resolution Patterning", Proc. SPIE, Mar. 1999, pp. 379-389, vol. 3676.

Lecture of Experimental Chemistry 20, 4th Ed., Organic Synthesis II, Maruzen, 1992, pp. 213-224.

The Chemistry of Heterocyclic Compounds—Small Ring Heterocycles, Part 3 Oxiranes, 1985, 199 pages, (edited by Alfred Hassner, John Wiley and Sons, An Interscience Publication, New York).

Yoshimura, Secchaku, 1985, pp. 32-39, vol. 29, No. 12.

Yoshimura, Secchaku, 1986, vol. 30, No. 5, pp. 42-47.

Yoshimura, Secchaku, 1986, vol. 30, No. 7, pp. 42-47.

Stephen C. Lapin, "Vinyl Ether Functionalized Urethane Oligomers: An Alternative to Acrylate Based Systems", Polymers Paint Colour Journal, May 17, 1989, pp. 321-328, vol. 179, No. 4237.

International Search Report dated Aug. 7, 2012 in International Application No. PCT/JP2012/068036.

Written Opinion of the International Searching Authority dated Aug. 7, 2012 in International Application No. PCT/JP2012/068036.

Office Action dated May 31, 2016, from the European Patent Office in counterpart European Application No. 12811906.2.

Opposition to Patent Before the Japanese Office dated Jun. 9, 2016 in Japanese Patent No. JP 5829177.

Encyclopedic Dictionary of Chemistry, First Edition, First Copy, pp. 2243, pp. 2251 (published on Oct. 20, 1989 by Tokyo Kagaku Doujin).

International Preliminary Report on Patentability dated Jan. 23, 2014 for International Application No. PCT/JP2012/068036.

* cited by examiner

CURABLE COMPOSITION FOR IMPRINTS, PATTERNING METHOD AND PATTERN

CROSS-REFERENCE TO RELATED APPLICATIONS

The present application is a continuation of PCT/JP2012/068036 filed on Jul. 9, 2012 and claims priority under 35 U.S.C. §119 of Japanese Patent Application No. 153468/2011, filed on Jul. 12, 2011, U.S. Application No. 61/507,818, filed on Jul. 14, 2011, and Japanese Patent Application No. 112278/2012, filed on May 16, 2012, the content of which is herein incorporated by reference in their entirety.

TECHNICAL FIELD

The present invention relates to a curable composition for imprints. More precisely, the invention relates to a curable composition for micropatterning to give imprints through photoirradiation, which is used in producing magnetic recording media such as semiconductor integrated circuits, flat screens, microelectromechanical systems (MEMS), sensor devices, optical discs, high-density memory discs, etc.; optical members such as gratings, relief holograms, etc.; optical films for production of nanodevices, optical devices, flat panel displays, etc.; polarizing elements, thin-film transistors in liquid-crystal displays, organic transistors, color filters, overcoat layers, pillar materials, rib materials for liquid-crystal alignment, microlens arrays, immunoassay chips, DNA separation chips, microreactors, nanobio devices, optical waveguides, optical filters, photonic liquid crystals, etc.

BACKGROUND ART

Imprint technology is a development advanced from embossing technology well known in the art of optical disc production, which comprises pressing a mold original with an embossed pattern formed on its surface (this is generally referred to as "mold", "stamper" or "template") against a resin to thereby accurately transfer the micropattern onto the resin through mechanical deformation of the resin. In this, when a mold is once prepared, then microstructures such as nanostructures can be repeatedly molded, and therefore, this is economical, and in addition, harmful wastes and discharges from this nanotechnology are reduced. Accordingly these days, this is expected to be applicable to various technical fields.

Two methods of imprint technology have been proposed; one is a thermal imprint method using a thermoplastic resin as the material to be worked (for example, see S. Chou, et al., Appl. Phys. Lett. Vol. 67, 3114 (1995)), and the other is a photoimprint method using a photocurable composition (for example, see M. Colbun, et al., Proc. SPIE, Vol. 3676, 379 (1999)). In the thermal imprint method, a mold is pressed against a polymer resin heated up to a temperature higher than the glass transition temperature thereof, then the resin is cooled and thereafter released from the mold to thereby transfer the microstructure of the mold onto the resin on a substrate. The method is applicable to various resin materials and glass materials and is expected to be applicable to various fields. For example, U.S. Pat. No. 5,772,905 and U.S. Pat. No. 5,956,216 disclose an imprint method of forming nanopatterns inexpensively.

On the other hand, in the photoimprint method where a photo-curable composition is cured by photoirradiation through a transparent mold or a transparent substrate, the transferring material does not require heating in pressing it against the mold, and therefore the method enables room-temperature imprinting. Recently, new developments having the advantages of the above two as combined, have been reported, including a nanocasting method and a reversal imprint method for forming three-dimensional structures.

For the imprint methods as above, proposed are applied technologies to nano-scale mentioned below.

In the first technology, the molded pattern itself has a function, and is applied to various elements in nanotechnology and to structural members. Its examples include various micro/nano optical elements and high-density recording media, as well as structural members in optical films, flat panel displays, etc. The second technology is for hybrid-molding of microstructures and nanostructures, or for construction of laminate structures through simple interlayer positioning, and this is applied to production of μ-TAS (micro-total analysis system) and biochips. In the third technology, the formed pattern is used as a mask and is applied to a method of processing a substrate through etching or the like. In these technologies, high-precision positioning is combined with high-density integration; and in place of conventional lithography technology, these technologies are being applied to production of high-density semiconductor integrated circuits and transistors in liquid-crystal displays, and also to magnetic processing for next-generation hard discs referred to as patterned media. Recently, the action on industrialization of the above-mentioned imprint technologies and their applied technologies has become active for practical use thereof.

As one example of imprint technology, hereinunder described is an application to production of high-density semiconductor integrated circuits. The recent development in micropatterning and integration scale enlargement in semiconductor integrated circuits is remarkable, and high-definition photolithography for pattern transfer for realizing the intended micropatterning is being much promoted and advanced in the art. However, for further requirement for more definite micropatterning to a higher level, it is now difficult to satisfy all the three of micropattern resolution, cost reduction and throughput increase. Regarding this, as a technology of micropatterning capable of attaining at a low cost, imprint lithography, particularly nanoimprint lithography (photonanoimprint method) is proposed. For example, U.S. Pat. No. 5,772,905 and U.S. Pat. No. 5,259,926 disclose a nanoimprint technology of using a silicon wafer as a stamper for transferring a microstructure of at most 25 nm. This application requires micropatternability on a level of a few tens nm and high-level etching resistance of the micropattern functioning as a mask in substrate processing.

An application example of imprint technology to production of next-generation hard disc drives (HDD) is described. Based on head performance improvement and media performance improvement closely connected with each other, the course of HDD history is for capacity increase and size reduction. From the viewpoint of media performance improvement, HDD has realized increased large-scale capacity as a result of the increase in the surface-recording density thereon. However, in increasing the recording density, there occurs a problem of so-called magnetic field expansion from the side surface of the magnetic head. The magnetic field expansion could not be reduced more than a certain level even though the size of the head is reduced, therefore causing a phenomenon of so-called sidelight. The sidelight, if any, causes erroneous writing on the adjacent tracks and may erase the already recorded data. In addition, owing to the magnetic field expansion, there may occur another problem in that superfluous signals may be read from the adjacent track in reproduction. To solve these problems, there are proposed technologies of discrete track media and bit patterned media of filling the distance between the adjacent tracks with a non-magnetic material to thereby physically and magnetically separate the tracks. As a method of forming the magnetic or non-magnetic pattern in production of these media, application of imprint technology is proposed. The application also requires micropatternability on a level of a few tens nm and high-level etching resistance of the micropattern functioning as a mask in substrate processing.

Next described is an application example of imprint technology to flat displays such as liquid-crystal displays (LCD) and plasma display panels (PDP).

With the recent tendency toward large-sized LCD substrates and PDP substrates for high-definition microprocessing thereon, photoimprint lithography has become specifically noted these days as an inexpensive lithography technology capable of being substituted for conventional photolithography for use in production of thin-film transistors (TFT) and electrode plates. Accordingly, it has become necessary to develop a photocurable resist capable of being substituted for the etching photoresist for use in conventional photolithography.

Further, for the structural members for LCD and others, application of photoimprint technology to transparent protective film materials described in JP-A-2005-197699 and 2005-301289, or to spacers described in JP-A-2005-301289 is being under investigation. Differing from the above-mentioned etching resist, the resist for such structural members finally remains in displays, and therefore, it may be referred to as "permanent resist" or "permanent film".

The spacer to define the cell gap in liquid-crystal displays is also a type of the permanent film; and in conventional photolithography, a photocurable composition comprising a resin, a photopolymerizable monomer and an initiator has been generally widely used for it (for example, see JP-A-2004-240241). In general, the spacer is formed as follows: After a color filter is formed on a color filter substrate, or after a protective film for the color filter is formed, a photocurable composition is applied thereto, and a pattern having a size of from 10 μm or 20 μm or so is formed through photolithography, and this is further thermally cured through past-baking to form the intended spacer.

The nanoimprint technology is also applicable to manufacturing of an anti-reflective structure generally called "moth eye". The anti-reflective structure having the refractive index thereof varied in the thickness-wise direction may be obtained by forming, on the surface of a transparent mold, a very large number of fine irregularities composed of a transparent material and having a pitch smaller than the wavelength of light. This sort of anti-reflective structure may theoretically be understood as a non-reflective body, since the refractive index thereof continuously varies in the thickness direction, so that there is no discontinuous boundary of refractive index. In addition, the anti-reflective structure has an anti-reflective performance better than that of a multi-layered, anti-reflective film, by virtue of its small wavelength dependence of refractive index and high anti-reflective performance to obliquely incident light.

Further, imprint lithography is useful also in formation of permanent films in optical members such as microelectromechanical systems (MEMS), sensor devices, gratings, relief holograms, etc.; optical films for production of nanodevices, optical devices, flat panel displays, etc.; polarizing elements, thin-film transistors in liquid-crystal displays, organic transistors, color filters, overcoat layers, pillar materials, rib materials for liquid-crystal alignment, microlens arrays, immunoassay chips, DNA separation chips, microreactors, nanobio devices, optical waveguides, optical filters, photonic liquid crystals, etc.

In application to such permanent films, the formed pattern remains in the final products, and is therefore required to have high-level properties of mainly film durability and strength, including heat resistance, light resistance, solvent resistance, scratch resistance, high-level mechanical resistance to external pressure, hardness, etc.

Almost all patterns heretofore formed in conventional photolithography can be formed in imprint technology, which is therefore specifically noted as a technology capable of forming micropatterns inexpensively.

In view of making industrial use of the nanoimprint technology, not only a good patternability, but also application-specific performances as described in the above are required.

International Patent Publication WO 2005/552 and JP-A-2005-84561 disclose that photo-curable compositions which contain fluorine-containing surfactants or modified silicone oils exhibit a good patternability when applied to nanoimprints. However, even with these compositions, problems have remained in that the patternability and defect-preventive performance may degrade after repetitive pattern transfer, and in that so-called line edge roughness, known as irregularities formed on the side faces of pattern after etching, may degrade when applied to processing of substrate.

JP-A-2010-18666 describes that the line edge roughness may be improved by adding a lubricant to the curable composition for imprints. Still further improvement is, however, required in consideration of recent demands for higher levels of suppression of line edge roughness.

SUMMARY OF THE INVENTION

From our thorough investigations into the prior art, the conventional curable compositions for imprints were found to have tendencies of degrading in any of the patternability, pattern defect and line edge roughness. In particular, the tendency was found to be more distinctive when the compositions were applied onto substrates using an inkjet device.

It is therefore an object of the present invention to solve the problems described in the above, and to provide a curable composition for imprints capable of keeping a good patternability and of producing less pattern defects even after repetitive pattern transfer. It is another object of the present invention to provide a curable composition for imprints capable of ensuring a small line edge roughness after etching even when used for processing of substrates. It is still another object of the present invention to provide a method of forming a pattern using the curable composition for imprints, and a pattern obtained by the method of forming a pattern.

After thorough investigations aimed at solving the above-described problems, the present inventors found out that a curable composition for imprints capable of ensuring a good patternability, less pattern defects, and small line edge roughness after etching when used for processing of substrates, is obtainable by adding a non-polymerizable compound having a polyalkylene glycol structure having at least one terminal hydroxy group, or at least one etherified terminal hydroxy group, and containing substantially no fluorine atom and no silicon atom. Since it has generally been known that addition of a polymerizable compound, or a compound containing fluorine atom(s) and/or silicon atom(s) is beneficial to various performances of the curable composition for imprints, so that it was unexpected that the above-described problems were solved by adding the non-polymerizable compound which has a polyalkylene glycol structure having at least one terminal hydroxy group, or at least one etherified terminal hydroxy group, and contains substantially no fluorine atom and no silicon atom.

More specifically, the problems described in the above were successfully solved by the solution described in (1) below, and more preferably by the solutions described in (2) to (15) below.

(1) A curable composition for imprints comprising:
a polymerizable compound (A);
a photo-polymerization initiator (B); and
a non-polymerizable compound (C) having a polyalkylene glycol structure having at least one terminal hydroxy group, or at least one etherified terminal hydroxy group, and containing substantially no fluorine atom and no silicon atom.

(2) The curable composition for imprints of (1), containing a (meth)acrylate compound, as the polymerizable compound (A).

(3) The curable composition for imprints of (1) or (2), wherein the polymerizable compound (A) contains a compound having aromatic group(s) and/or alicyclic hydrocarbon group(s).

(4) The curable composition for imprints of any one of (1)-(3), wherein the polymerizable compound (A) contains a compound having fluorine atom(s) and/or silicon atom(s).

(5) The curable composition for imprints of any one of (1)-(4), containing at least one species selected from polyalkylene glycol, polyalkylene glycol ether and polyalkylene glycol ester, as the non-polymerizable compound (C).

(6) The curable composition for imprints of any one of (1)-(4), containing polypropylene glycol, as the non-polymerizable compound (C).

(7) The curable composition for imprints of any one of (1)-(6), containing substantially no solvent.

(8) The curable composition for imprints of any one of (1)-(7), further containing a surfactant.

(9) The curable composition for imprints of any one of (1)-(8), designed for inkjet process.

(10) The curable composition for imprints of any one of (1)-(9), containing a diol type polyalkylene glycol, as the non-polymerizable compound (C).

(11) A method of forming a pattern, the method comprising applying the curable composition for imprints described in any one of (1)-(10) on a base, or on a mold having a fine pattern formed thereon, pressing the mold or the base against the curable composition for imprints, and irradiating the curable composition for imprints with light.

(12) The method of forming a pattern of (11), wherein the curable composition for imprints is applied on the base, or on the mold by an inkjet method.

(13) A pattern obtained by the method described in (11) or (12).

(14) An electronic device comprising the pattern described in (13).

(15) A method of manufacturing an electronic device comprising the method of forming a pattern described in (11) or (12).

By using the composition of the present invention, it now became possible to provide a curable composition for imprints, capable of ensuring a good patternability, less pattern defects, and small line edge roughness after etching when used for processing of substrates.

MODES FOR CARRYING OUT THE INVENTION

The contents of the invention are described in detail hereinunder. In this specification, the numerical range expressed by the wording "a number to another number" means the range that falls between the former number indicating the lowermost limit of the range and the latter number indicating the uppermost limit thereof. In this specification, mass ratio is equal to weight ratio.

In this description, "(meth)acrylate" means acrylate and methacrylate; "(meth)acrylic" means acrylic and methacrylic; "(meth)acryloyl" means acryloyl and methacryloyl. In the invention, "monomer" is differentiated from oligomer and polymer, and the monomer indicates a compound having a weight-average molecular weight of at most 1,000. In this description, "polymerizable compound" means a compound having a polymerizable functional group, concretely, a compound having a group that participates in polymerization. "Imprint" referred to in the invention is meant to indicate pattern transfer in a size of from 1 nm to 10 mm, more preferably pattern transfer in a size of approximately from 10 nm to 100 μm (for nanoimprints).

Regarding the expression of "group (atomic group)" in this description, the expression with no indication of "substituted" or "unsubstituted" includes both "substituted group" and "unsubstituted group". For example, "alkyl group" includes not only an alkyl group not having a substituent (unsubstituted alkyl group) but also an alkyl group having a substituent (substituted alkyl group).

[Curable Composition for Imprints of the Present Invention]

The curable composition for imprints of the present invention (occasionally referred to simply as "curable composition of the present invention", hereinafter) includes (A) one or more species of polymerizable compound, (B) one or more species of photo-polymerization initiator, and (C) one or more species of non-polymerizable compound having a polyalkylene glycol structure having at least one terminal hydroxy group, or at least one etherified terminal hydroxy group, and containing substantially no fluorine atom and no silicon atom.

Polymerizable compound (A)

Species of the polymerizable compound adaptable to the curable composition for imprints used for the present invention is not specifically limited, without departing from the gist of the present invention, and may be exemplified by polymerizable unsaturated monomer having 1 to 6 ethylenic unsaturated bond-containing groups; epoxy compound; oxetane compound; vinyl ether compound; styrene derivative; fluorine atom-containing compound; and propenyl ether or butenyl ether, preferably (meth)acrylate compound, epoxy compound, oxetane compound and vinyl ether compound.

The polymerizable unsaturated monomer having 1 to 6 ethylenic unsaturated bond-containing groups are described below.

The polymerizable unsaturated monomer having one ethylenic unsaturated bond-having group (mono-functional polymerizable unsaturated monomer) includes concretely methyl(meth)acrylate, ethyl(meth)acrylate, butyl(meth)acrylate, N-vinyl pyrrolidinone, 2-acryloyloxyethyl phthalate, 2-acryloyloxy-2-hydroxyethyl phthalate, 2-acryloyloxyethyl hexahydrophthalate, 2-acryloyloxypropyl phthalate, 2-ethyl-2-butylpropanediol acrylate, 2-ethylhexyl (meth)acrylate, 2-ethylhexylcarbitol (meth)acrylate, 2-hydroxybutyl(meth)acrylate, 2-hydroxyethyl(meth)acrylate, 2-hydroxypropyl(meth)acrylate, 4-hydroxybutyl(meth)acrylate, acrylic acid dimer, benzyl(meth)acrylate, 1- or 2-naphthyl(meth)acrylate, butoxyethyl(meth)acrylate, cetyl(meth) acrylate, ethyleneoxide-modified (hereinafter this may be referred to as "EO") cresol (meth)acrylate, dipropylene glycol (meth)acrylate, ethoxylated phenyl(meth)acrylate, isoamyl(meth)acrylate, cyclopentanyl(meth)acrylate, isobornyl(meth)acrylate, dicyclopentanyl(meth)acrylate, dicyclopentanyloxyethyl(meth)acrylate, isomyristyl(meth) acrylate, lauryl(meth)acrylate, methoxydiproylene glycol (meth)acrylate, methoxytripropylene glycol (meth)acrylate, methoxypolyethylene glycol (meth)acrylate, methoxytriethylene glycol (meth)acrylate, neopentyl glycol benzoate (meth)acrylate, nonylphenoxypolyethylene glycol (meth) acrylate, nonylphenoxypolypropylene glycol (meth)acrylate, octyl(meth)acrylate, paracumylphenoxyethylene glycol (meth)acrylate, epichlorohydrin (hereinafter referred to as "ECH")-modified phenoxyacrylate, 2-phenoxyethyl(meth) acrylate, phenoxydiethylene glycol (meth)acrylate, phenoxyhexaethylene glycol (meth)acrylate, phenoxytetraethylene glycol (meth)acrylate, polyethylene glycol (meth) acrylate, polyethylene glycol-polypropylene glycol (meth) acrylate, polypropylene glycol (meth)acrylate, stearyl(meth) acrylate, EO-modified succinic acid (meth)acrylate, tribromophenyl(meth)acrylate, EO-modified tribromophenyl(meth)acrylate, tridodecyl(meth)acrylate, p-isopropenylphenol, styrene, N-vinyl pyrrolidone, N-vinyl caprolactam.

Of the monofunctional polymerizable monomers having ethylenic unsaturated bond (s), monofunctional (meth)acrylate compound is preferably used in the present invention, from the viewpoint of photo-curability. The monofunctional (meth)acrylate compound may be exemplified by those previously exemplified as the monofunctional polymerizable monomers having ethylenic unsaturated bond (s).

As the other polymerizable monomer, also preferred is a poly-functional polymerizable unsaturated monomer having two ethylenic unsaturated bond-containing groups.

Preferred examples of the di-functional polymerizable unsaturated monomer having two ethylenic unsaturated bond-containing groups for use in the invention include diethylene glycol monoethyl ether (meth)acrylate, dimethylol-dicyclopentane di(meth)acrylate, di(meth)acrylated isocyanurate, 1,3-butylene glycol di(meth)acrylate, 1,4-butanediol di(meth)acrylate, EO-modified 1,6-hexanediol di(meth)acrylate, ECH-modified 1,6-hexanediol di(meth) acrylate, allyloxy-polyethylene glycol acrylate, 1,9-nonanediol di(meth)acrylate, EO-modified bisphenol A di(meth) acrylate, PO-modified bisphenol A di(meth)acrylate, modified bisphenol A di(meth)acrylate, EO-modified bisphenol F di(meth)acrylate, ECH-modified hexahydrophthalic acid diacrylate, hydroxypivalic acid neopentyl glycol di(meth)acrylate, neopentyl glycol di(meth)acrylate, EO-modified neopentyl glycol diacrylate, propyleneoxide (hereinafter referred to as "PO")-modified neopentyl glycol diacrylate, caprolactone-modified hydroxypivalate neopentyl glycol, stearic acid-modified pentaerythritol di(meth) acrylate, ECH-modified phthalic acid di(meth)acrylate, poly (ethylene glycol-tetramethylene glycol) di(meth)acrylate, poly(propylene glycol-tetramethylene glycol) di(meth)acrylate, polyester (di) acrylate, polyethylene glycol di(meth) acrylate, polypropylene glycol di(meth)acrylate, ECH-modified propylene glycol di(meth)acrylate, silicone di(meth)acrylate, triethylene glycol di(meth)acrylate, tetraethylene glycol di(meth)acrylate, dimethyloltricyclodecane di(meth)acrylate, neopentyl glycol-modified trimethylolpropane di(meth)acrylate, tripropylene glycol di(meth)acrylate, EO-modified tripropylene glycol di(meth)acrylate, triglycerol di(meth)acrylate, dipropylene glycol di(meth)acrylate, divinylethylene-urea, divinylpropylene-urea, o-, m-, or p-Xylylene di(meth)acrylate, 1,3-adamantane diacrylate, norbornane dimethanol diacrylate, tricyclodecane dimethanol di(meth)acrylate.

Of those, especially preferred for use in the invention are di-functional (meth)acrylates including neopentyl glycol di(meth)acrylate, 1,9-nonanediol di(meth)acrylate, tripropylene glycol di(meth)acrylate, tetraethylene glycol di(meth)acrylate, hydroxypivalate neopentyl glycol di(meth)acrylate, polyethylene glycol di(meth)acrylate, o-, m-, or p-, benzene di(meth)acrylate, o-, m-, or p-xylylene di(meth) aclyate, etc.

Examples of the poly-functional polymerizable unsaturated monomer having at least three ethylenic unsaturated bond-having groups include ECH-modified glycerol tri (meth)acrylate, EO-modified glycerol tri(meth)acrylate, PO-modified glycerol tri(meth)acrylate, pentaerythritol triacrylate, EO-modified phosphoric acid triacrylate, trimethylolpropane tri(meth)acrylate, caprolactone-modified trimethylolpropane tri(meth)acrylate, EO-modified trimethylolpropane tri(meth)acrylate, PO-modified trimethylolpropane tri(meth)acrylate, tris(acryloxyethyl) isocyanurate, dipentaerythritol hexa(meth)acrylate, caprolactene-modified dipentaerythritol hexa(meth)acrylate, dipentaerythritol hydroxy-penta(meth)acrylate, alkyl-modified dipentaerythritol penta(meth)acrylate, dipentaerythritol poly(meth)acrylate, alkyl-modified dipentaerythritol tri (meth)acrylate, ditrimethylolpropane tetra(meth)acrylate, pentaerythritol ethoxy-tetra(meth)acrylate, pentaerythritol tetra(meth)acrylate, etc.

Of those, especially preferred for use in the invention are EO-modified glycerol tri(meth)acrylate, PO-modified glycerol tri(meth)acrylate, trimethylolpropane tri(meth)acrylate, EO-modified trimethylolpropane tri(meth)acrylate, PO-modified trimethylolpropane tri(meth)acrylate, dipentaerythritol hexa(meth)acrylate, pentaerythritol ethoxy-tetra (meth)acrylate, pentaerythritol tetra(meth)acrylate, etc.

Of the above (meth)acrylate compounds, acrylate compounds are preferable from the viewpoint of photo-curability.

The oxirane ring-having compound (epoxy compound) includes, for example, polyglycidyl esters of polybasic acids, polyglycidyl ethers of polyalcohols, polyglycidyl ethers of polyoxyalkylene glycols, polyglycidyl ethers of aromatic polyols, hydrogenated polyglycidyl ethers of aromatic polyols, urethane-polyepoxy compounds, epoxidated polybutadienes, etc. One or more of these compounds may be used either singly or as combined.

Examples of the oxirane ring-having compound (epoxy compound) preferred for use in the invention include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, hydrogenated bisphenol A diglycidyl ether, hydrogenated bisphenol F diglycidyl ether, hydrogenated bisphenol S diglycidyl ether, 1,4-butanediol diglycidyl ether, 1,6-hexanediol diglycidyl ether, glycerin triglycidyl ether, trimethylolpropane triglycidyl ether, polyethylene glycol diglycidyl ether, polypropylene glycol diglycidyl ether; polyglycidyl ethers of polyether polyols produced by adding one or more alkylene oxides to aliphatic polyalcohol such as ethylene glycol, propylene glycol, glycerin or the like; diglycidyl esters of aliphatic long-chain dibasic acids; monoglycidyl ethers of aliphatic higher alcohols; monoglycidyl ethers of polyether alcohols produced by adding alkyleneoxide to phenol, cresol, butylphenol or the like; glycidyl esters of higher fatty acids, etc.

Of those, especially preferred are bisphenol A diglycidyl ether, bisphenol F diglycidyl ether, hydrogenated bisphenol A diglycidyl ether, hydrogenated bisphenol F diglycidyl ether, 1,4-butanediol diglycidyl ether, 1,6-hexanediol diglycidyl ether, glycerin triglycidyl ether, trimethylolpropane triglycidyl ether, neopentyl glycol diglycidyl ether, polyethylene glycol diglycidyl ether, polypropylene glycol diglycidyl ether.

Commercial products favorable for use herein as the glycidyl group-having compound are UVR-6216 (by Union Carbide), Glycidol, AOEX24, Cyclomer A200 (all by Daicel Chemical Industry), Epikote 828, Epikote 812, Epikote 1031, Epikote 872, Epikote CT508 (all by Yuka Shell), KRM-2400, KRM-2410, KRM-2408, KRM-2490, KRM-2720, KRM-2750 (all by Asahi Denka Kogyo), etc. One or more of these may be used either singly or as combined.

The production method for the oxirane ring-having compounds is not specifically defined. For example, the compounds may be produced with reference to publications of Lecture of Experimental Chemistry 20, 4th Ed., Organic Synthesis II, p. 213, ff. (Maruzen, 1992); The chemistry of heterocyclic compounds—Small Ring Heterocycles, Part 3, Oxiranes (edited by Alfred Hasfner, John & Wiley and Sons, An Interscience Publication, New York, 1985); Yoshimura, Adhesive, Vol. 29, No. 12, 32, 1985; Yoshimura, Adhesive, Vol. 30, No. 5, 42, 1986; Yoshimura, Adhesive, Vol. 30, No. 7, 42, 1986; JP-A-11-100378, Japanese Patents 2906245 and 2926262.

As the polymerizable compound for use in the invention, vinyl ether compounds may be used. Any known vinyl ether compounds are usable, including, for example, 2-ethylhexyl vinyl ether, butanediol 1,4-divinyl ether, diethylene glycol monovinyl ether, ethylene glycol divinyl ether, triethylene glycol divinyl ether, 1,2-propanediol divinyl ether, 1,3-propanediol divinyl ether, 1,3-butanediol divinyl ether, 1,4-butanediol divinyl ether, tetramethylene glycol divinyl ether, neopentyl glycol divinyl ether, trimethylolpropane trivinyl ether, trimethylolethane trivinyl ether, hexanediol divinyl ether, tetraethylene glycol divinyl ether, pentaerythritol divinyl ether, pentaerythritol trivinyl ether, pentaerythritol tetravinyl ether, sorbitol tetravinyl ether, sorbitol pentavinyl ether, ethylene glycol diethylene vinyl ether, triethylene glycol diethylene vinyl ether, ethylene glycol dipropylene vinyl ether, triethylene glycol diethylene vinyl ether, trimethylolpropane triethylene vinyl ether, trimethylolpropane diethylene vinyl ether, pentaerythritol diethylene vinyl ether, pentaerythritol triethylene vinyl ether, pentaerythritol tetraethylene vinyl ether, 1,1,1-tris[4-(2-vinyloxyethoxy)phenyl]ethane, bisphenol A divinyloxyethyl ether, etc.

These vinyl ether compounds can be produced, for example, according to the method described in Stephen. C. Lapin, Polymers Paint Colour Journal, 179 (4237), 321 (1988), concretely through reaction of a polyalcohol or a polyphenol with acetylene, or through reaction of a polyalcohol or a polyphenol with a halogenoalkyl vinyl ether. One or more of these compounds may be used either singly or as combined.

As the other polymerizable compound (A2) for use in the invention, styrene derivatives may also be employed. The styrene derivatives include, for example, styrene, p-methylstyrene, p-methoxystyrene, β-methylstyrene, p-methyl-β-methylstyrene, α-methylstyrene, p-methoxy-β-methylstyrene, p-hydroxystyrene, etc.

The polymerizable compounds used in the present invention preferably have an alicyclic hydrocarbon structure or an aromatic group. By using the polymerizable compound having an alicyclic hydrocarbon structure or an aromatic group, the line edge roughness when the curable composition for imprints is used as an etching resist for processing of substrate may be improved. In particular, a distinctive effect may be obtained by using a multi-functional polymerizable compound having an alicyclic hydrocarbon structure or an aromatic group.

The polymerizable compound having an alicyclic hydrocarbon structure is preferably represented by the formula (X) below:

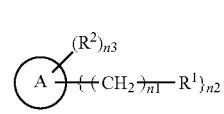

Formula (X)

(In the formula (X), "A" represents a monocyclic or condensed-ring alicyclic hydrocarbon group, $R^1$ represents a polymerizable group, and $R^2$ represents a substituent. n1 denotes an integer of 1 to 3, n2 denotes an integer of 1 to 6, and n3 denotes an integer of 0 to 5. When n2 is 1, at least one of ($R^2$)s represents a polymerizable group.)

"A" represents a monocyclic or condensed-ring alicyclic hydrocarbon group, preferably composed of a $C_{3-30}$ ring, and more preferably composed of a $C_{5-20}$ ring.

"A" is preferably composed of a monocycle, or a condensed ring having 2 or 3 rings. "A" is preferably a five-membered ring or six-membered ring, or, a condensed ring having a five-membered ring or six-membered ring; preferably cyclohexane, norbornane, or tricyclodecane; and more preferably tricyclodecane.

$R^1$ preferably represents a (meth)acryloyloxy group, and more preferably an acryloyloxy group.

$R^2$ represents a substituent, preferably a polymerizable group or alkyl group, more preferably a (meth)acryloyloxy group or methyl group, and particularly preferably an acryloyloxy group.

n1 denotes an integer of 1 to 3, and more preferably an integer of 1 or 2.

n2 denotes an integer of 1 to 6, preferably an integer of 2 to 6, more preferably an integer of 2 to 4, still more preferably or 3, and particularly preferably 2.

n3 denotes an integer of 0 to 5, preferably an integer of 0 to 3, and more preferably 0.

Examples of compounds represented by the formula (X) will be enumerated below, of course without limiting the present invention.

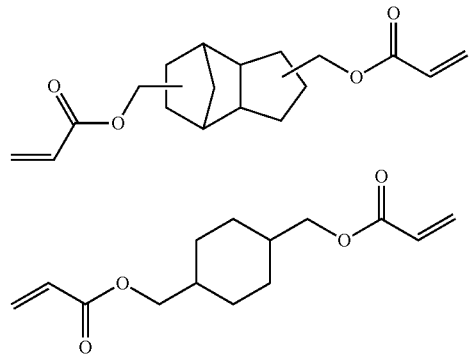

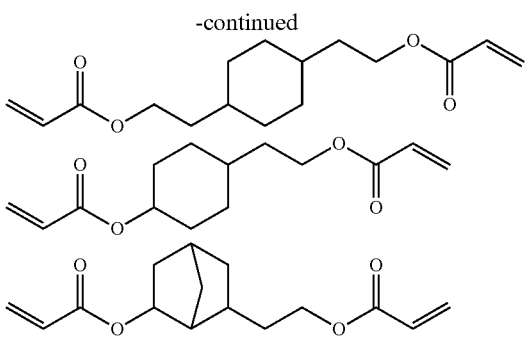

Preferable examples of the polymerizable compound having an alicyclic hydrocarbon structure, other than those enumerated in the above, include mono-functional (meth)acrylate having an alicyclic hydrocarbon structure, such as isoboronyl(meth)acrylate, dicyclopentanyl(meth)acrylate, dicyclopentanyl oxyethyl(meth)acrylate, dicyclopentenyl (meth)acrylate, adamantyl(meth)acrylate, tricyclodecanyl (meth)acrylate and tetracyclododecanyl(meth)acrylate; and multi-functional (meth)acrylate having an alicyclic hydrocarbon structure, such as tricyclodecane dimethanol di(meth)acrylate and 1,3-adamantanediol di(meth)acrylate.

As the polymerizable monomer compound having an aromatic structure is preferably a mono-functional (meth)acrylate compound represented by the formula (I) or a poly-functional (meth)acrylate compound represented by the formula (II) as mentioned below.

wherein Z is a group having an aromatic group; $R^1$ represents a hydrogen atom, an alkyl group, or a halogen atom.

$R^1$ is preferably a hydrogen atom, or an alkyl group, more preferably a hydrogen atom, or a methyl group, further more preferably a hydrogen atom from the viewpoint of the curability of the composition. Examples of the halogen atom include fluorine atom, chlorine atom, bromine atom, and iodine atom, and preferred is fluorine atom.

Z is an aralkyl group which may have a substituent, an aryl group which may have a substituent, or a group in which those groups are bonded to each other via a linking group. The linking group may include a hetero atom. The linking group is preferably —$CH_2$—, —O—, —C(=O)—, —S—, or a combination thereof. The aromatic group contained in Z is preferably a phenyl group or a naphthyl group. The molecular weight of Z is preferably 90 to 300, more preferably 120 to 250.

When the polymerizable monomer (Ax) is liquid at 25° C., the viscosity thereof is preferably 2 to 500 mPa·s at 25° C., more preferably 3 to 200 mPa·s, further more preferably 3 to 100 mPa·s. The polymerizable monomer (Ax) is preferably liquid at 25° C., or solid having a melting point of 60° C. or less, more preferably a melting point of 40° C. or less, further more preferably liquid at 25° C., or solid having a melting point of 25° C. or less.

Z preferably represents —$Z^1$—$Z^2$. $Z^1$ is a single bond, or a hydrocarbon group which may have a linking group containing a hetero atom in the chain thereof. $Z^2$ is an aromatic group which may have a substituent. $Z^2$ has a molecular weight of 90 or more.

$Z^1$ is more preferably an alkylene group not having a linking group containing a hetero atom in the chain thereof, more preferably a methylene group, or an ethylene group. Examples of the linking group containing a hetero atom include —O—, —C(=O)—, —S—, and a combination of an alkylene group and at least one of —O—, —C(=O)— and —S—. The number of the carbon atoms of 21 is preferably 1 to 3.

$Z^2$ is also preferably a group in which two or more aromatic groups directly bond to each other, or a group in which two or more aromatic groups bond to each other via a linking group. The linking group is preferably —$CH_2$—, —O—, —C(=O)—, —S—, or a combination thereof.

Examples of a substituent which the aromatic group may have include a halogen atom (fluorine atom, chlorine atom, bromo atom, iodine atom), a linear, a branched, or a cyclic alkyl group, an alkenyl group, an alkynyl group, an aryl group, an acyl group, an alkoxycarbonyl group, an aryloxycarbonyl group, a carbamoyl group, a cyano group, a carboxyl group, a hydroxy group, an alkoxy group, an aryloxy group, an alkylthio group, an arylthio group, a heterocyclic-oxy group, an acyloxy group, an amino group, a nitro group, a hydrazino group, a heterocyclic group. A group which is substituted with those groups is also preferred.

The amount of the compound represented by the formula (I) to be added in the composition is preferably 10 to 100% by mass, more preferably 20 to 100% by mass, further more preferably 30 to 80% by mass.

Of the compounds represented by the formula (I), specific examples of the compounds not having a substituent on the aromatic ring include benzyl(meth)acrylate, phenethyl (meth)acrylate, phenoxyethyl(meth)acrylate, 1- or 2-naphtyl (meth)acrylate, 1- or 2-naphtylmethyl(meth)acrylate, and 1- or 2-naphthylethyl(meth)acrylate.

Another preferable compound represented by the formula (I) is a compound having substituents on the aromatic ring thereof represented by the formula (I-1) below:

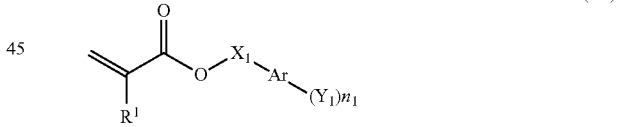

(In the formula (I-1), $R^1$ represents a hydrogen atom, alkyl group or halogen atom, X represents a single bond or hydrocarbon group, and the hydrocarbon group may contain, in the chain thereof, a linking group having a hetero atom. $Y^1$ represents a substituent having a formula weight of 15 or larger, and n1 denotes an integer of 1 to 3. Ar represents an aromatic linking group, and is preferably a phenylene group or naphthylene group.)

$R^1$ is synonymous to $R^1$ in the formula in the above, specified by the same preferable ranges.

$X^1$ is synonymous to $Z^1$ in the above, specified by the same preferable ranges.

$Y^1$ is a substituent having a formula weight of 15 or larger, and is exemplified by alkyl group, alkoxy group, aryloxy group, aralkyl group, acyl group, alkoxycarbonyl group, alkylthio group, arylthio group, halogen atom, and cyano group. These substituents may have additional substituent(s).

When n1 is 2, $X^1$ is preferably a single bond or $C_1$ hydrocarbon group.

In a particularly preferable example, n1 is 1, and $X^1$ represents a $C_{1-3}$ alkylene group.

The compound represented by the formula (I-2) is more preferably a compound represented by either one of the formulae (I-2) and (I-3).

Compound Represented by Formula (I-2)

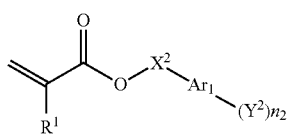

(I-2)

In the formula (I-2), $R^1$ represents a hydrogen atom, alkyl group or halogen atom. $X^2$ represents a single bond or hydrocarbon group, and the hydrocarbon group may contain, in the chain thereof, a linking group having therein a hetero atom. $Y^2$ represents a substituent having no aromatic group and having a formula weight of 15 or larger, and n2 denotes an integer of 1 to 3.

$R^1$ is synonymous to $R^1$ in the formula in the above, specified by the same preferable ranges.

When $X^2$ represents a hydrocarbon group, the hydrocarbon group is preferably $C_{1-3}$, preferably a substituted or unsubstituted $C_{1-3}$ alkylene group, more preferably an unsubstituted $C_{1-3}$ alkylene group, and still more preferably a methylene group or ethylene group. By adopting such hydrocarbon group, the photo-curable composition will have lower viscosity and lower volatility.

$Y^2$ represents a substituent having no aromatic group and having a formula weight of 15 or larger, the upper limit of which being preferably 150 or smaller. Preferable examples of $Y^2$ include $C_{1-6}$ alkyl groups such as methyl group, ethyl group, isopropyl group, tert-butyl group and cyclohexyl group; halogen atoms such as fluoro group, chloro group, and bromo group; $C_{1-6}$ alkoxy groups such as methoxy group, ethoxy group, and cyclohexyloxy group; and cyano group.

n2 preferably denotes an integer of 1 or 2. When n2 is 1, the substituent Y is preferably at the para position. From the viewpoint of viscosity, when n2 is 2, $X^2$ preferably represents a single bond or $C_1$ hydrocarbon group.

In view of concomitantly achieving low viscosity and low volatility, the (meth)acrylate compound represented by the formula (I-2) preferably has a molecular weight of 175 to 250, and more preferably 185 to 245.

The (meth)acrylate compound represented by the formula (I-2) preferably has a viscosity at 25° C. of 50 mPa·s or smaller, and more preferably 20 mPa·s or smaller.

The compound represented by the formula (IV) is also preferably used as a reactive diluent.

Amount of addition of the compound represented by the formula (I-2) in the photo-curable composition is preferably 10% by mass or more, from the viewpoint of viscosity of the composition or pattern accuracy after being cured, more preferably 15% by mass or more, and particularly preferably 20% by mass or more. On the other hand, from the viewpoint of tackiness or mechanical strength after being cured, the amount of addition is preferably 95% by mass or less, more preferably 90% by mass or less, and particularly preferably 85% by mass or less.

Examples of the compound represented by the formula (I-2) will be shown below, of course without limiting the present invention.

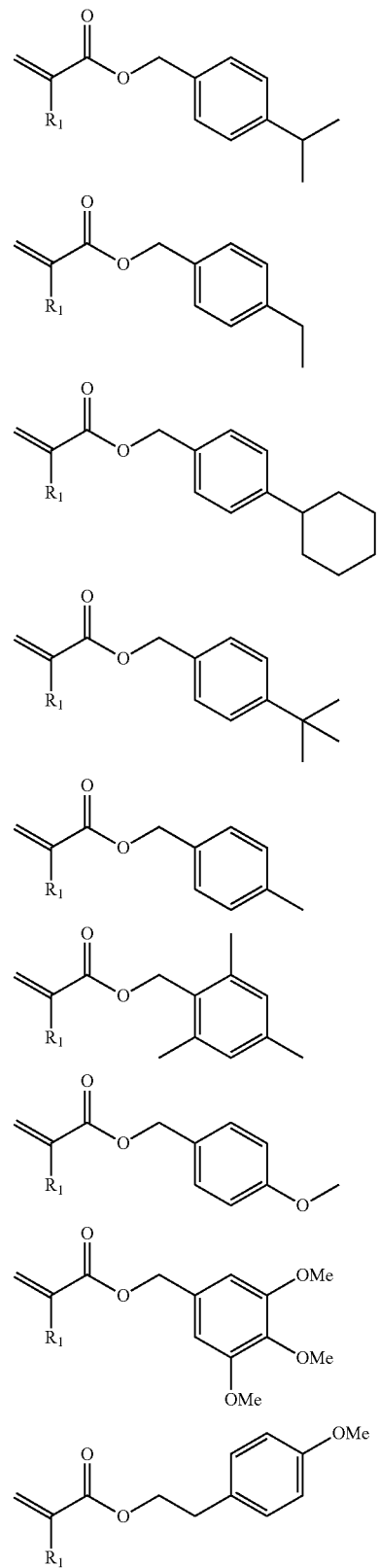

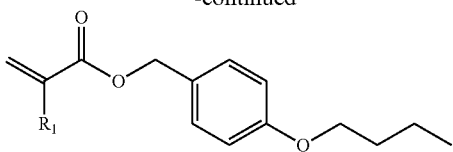
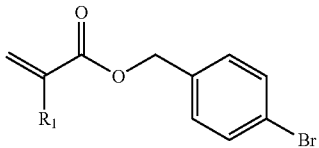
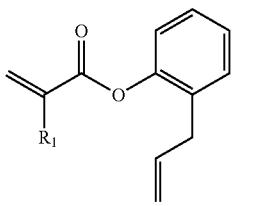
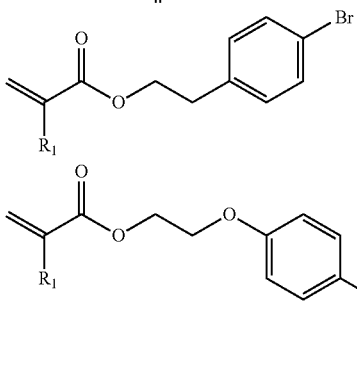
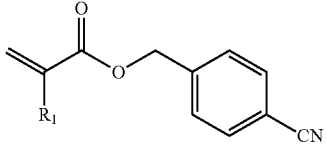
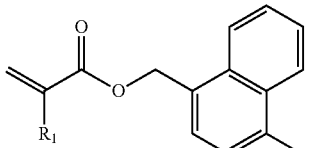
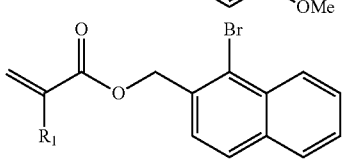

Compound Represented by Formula (I-3)

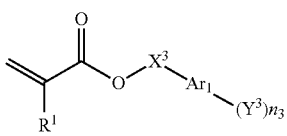
(I-3)

(In the formula (V), $R^1$ represents a hydrogen atom, alkyl group or halogen atom, $X^3$ represents a single bond or hydrocarbon group, wherein the hydrocarbon group may contain, in the chain thereof, a linking group having therein a hetero atom. $Y^3$ represents a substituent having an aromatic group, and n3 denotes an integer of 1 to 3.)

$R^1$ is synonymous to $R^1$ in the formula in the above, specified by the same preferable ranges.

$Y^3$ represents a substituent having an aromatic group, wherein the aromatic group is preferably bonded, via a single bond or a liking group, to the aromatic group Ar in the formula (V). Preferable examples of the linking group include alkylene group, hetero-atom-containing linking group (preferably —O—, —S—, —C(=O)O—,), and combinations of them, wherein alkylene group, —O—, or any groups composed of combinations of them are more preferable. The substituent having an aromatic group preferably has a phenyl group together with a single bond or the above-described linking group, wherein particularly preferable examples include phenyl group, benzyl group, phenoxy group, benzyloxy group, and phenylthio group. $Y^3$ preferably has a formula weight of 230 to 350.

n3 is preferably 1 or 2, and more preferably 1.

Amount of addition of the compound represented by the formula (I-3) in the photo-curable composition of the present invention is preferably 10% by mass or more, more preferably 20% by mass or more, and particularly preferably 30% by mass or more. On the other hand, from the viewpoint of tackiness and mechanical strength after being cured, the amount of addition is preferably 90% by mass or less, more preferably 80% by mass or less, and particularly preferably 70% by mass or less.

Examples of the compound represented by the formula (I-3) will be shown below, of course without limiting the present invention.

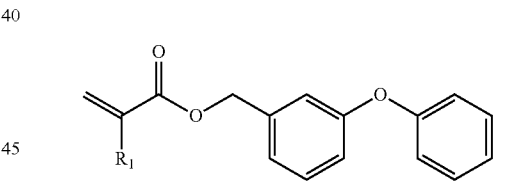
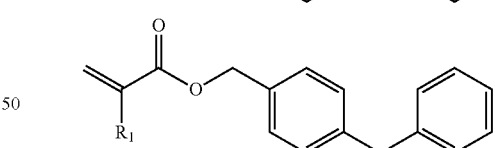
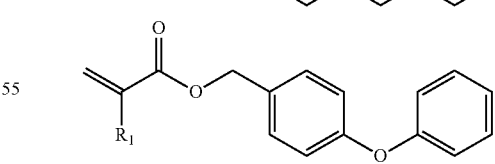
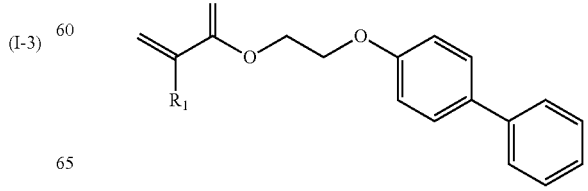

-continued

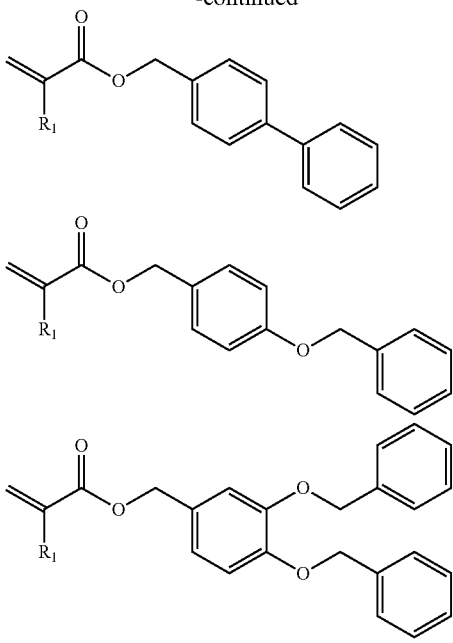

Multi-Functional (Meth)Acrylate Compound Represented by Formula (II)

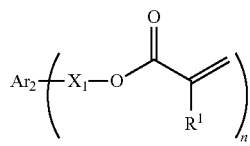
(II)

In the formula, Ar$_2$ represents an n-valent linking group having an aromatic group, and preferably a linking group having a phenylene group. X$_1$ and R$^1$ are synonymous to those described in the above. n is 1 to 3, and preferably 1.

The compound represented by the formula (II) is preferably the compounds represented by the formula (II-1) or (II-2) below.

Compound Represented by Formula (II-1)

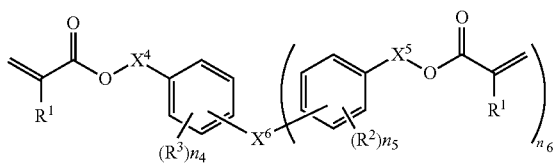
(II-1)

(In the formula (II-1), X$^6$ represents a (n6+1)-valent linking group, and each R$^1$ independently represents a hydrogen atom, alkyl group, or halogen atom. Each of R$^2$ and R$^3$ independently represents a substituent, and each of n4 and n5 independently represents an integer of 0 to 4. n6 is 1 or 2, each of X$^4$ and X$^5$ independently represents a hydrocarbon group, and the hydrocarbon group may contain, in the chain thereof, a hetero-atom-containing linking group.)

X$^6$ represents a single bond or (n6+1)-valent linking group, and preferably represents an alkylene group, —O—, —S—, —C(=O)O—, or linking group composed of an arbitrary combination of them. The alkylene group is preferably a C$_{1-8}$ alkylene group, more preferably a C$_{1-3}$ alkylene group, and is preferably unsubstituted.

n6 is preferably 1. When n6 is 2, each of a plurality of (R$^1$)s, (X$^5$)s and (R$^2$)s may be same or different from each other.

Each of X$^4$ and X$^5$ independently represents an alkylene group having no linking group, preferably a C$_{1-5}$ alkylene group, more preferably a C$_{1-3}$ alkylene group, and most preferably a methylene group.

R$^1$ is synonymous to R$^1$ in the formula in the above, specified by the same preferable ranges.

Each of R$^2$ and R$^3$ independently represents a substituent, and is preferably an alkyl group, halogen atom, alkoxy group, acyl group, acyloxy group, alkoxycarbonyl group, cyano group, or nitro group. The alkyl group is preferably a C$_{1-8}$ alkyl group. The halogen atom is exemplified by fluorine atom, chlorine atom, bromine atom, and iodine atom, wherein fluorine atom is preferable. The alkoxy group is preferably a C$_{1-8}$ alkoxy group. The acyl group is preferably a C$_{1-8}$ acyl group. The acyloxy group is preferably a C$_{1-8}$ acyloxy group. The alkoxycarbonyl group is preferably a C$_{1-8}$ alkoxycarbonyl group.

Each of n4 and n5 independently represents an integer of 0 to 4. When n4 or n5 is 2 or larger, each of a plurality of (R$^2$)s and (R$^3$)s may be same or different from each other.

The compound represented by the formula (II-1) is preferably a compound represented by the formula (II-1a) below:

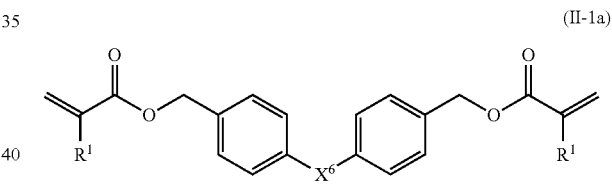
(II-1a)

(X$^6$ represents an alkylene group, —O—, —S— or a linking group composed of an arbitrary combination of them, and each R$^1$ independently represents a hydrogen atom, alkyl group or halogen atom.)

R$^1$ is synonymous to R$^1$ in the formula in the above, specified by the same preferable ranges.

When X$^6$ represents an alkylene group, it is preferably a C$_{1-8}$ alkylene group, more preferably a C$_{1-3}$ alkylene group, and is preferably unsubstituted.

X$^6$ is preferably —CH$_2$—, —CH$_2$CH$_2$—, —O— or —S—.

While content of the compound represented by the formula (II-1) in the photo-curable composition of the present invention is not specifically limited, from the viewpoint of viscosity of the photo-curable composition, it is preferably 1 to 100% by mass of the total mass of polymerizable compound, more preferably 5 to 70% by mass, and particularly preferably 10 to 50% by mass.

Examples of the compounds represented by the formula (II-1) will be shown below, of course without limiting the present invention. R$^1$ is synonymous to R$^1$ in the formula (II-1), specified by the same preferable ranges, and is particularly preferably a hydrogen atom.

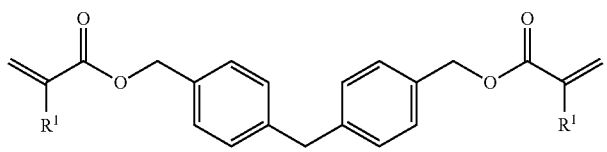
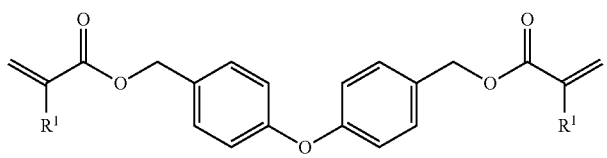
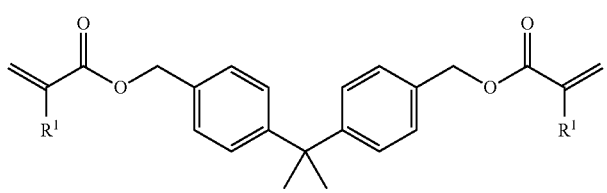
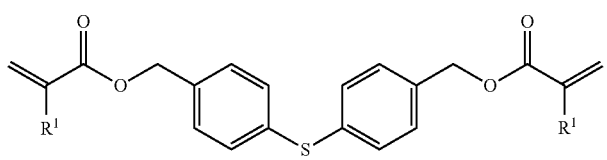
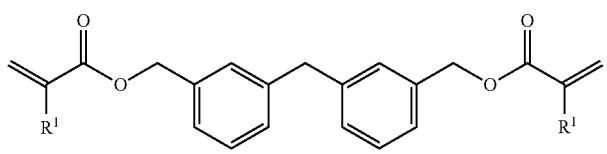
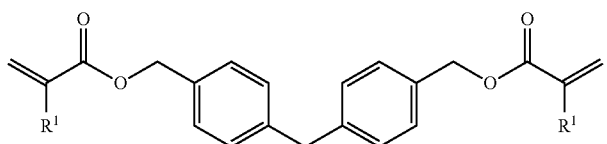
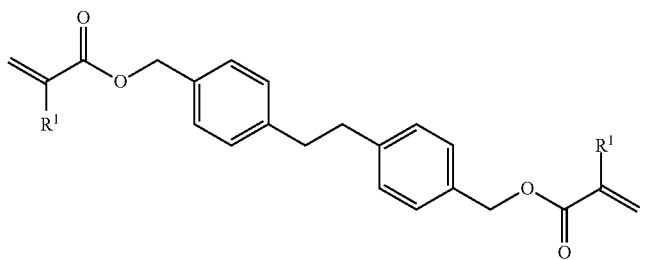

-continued

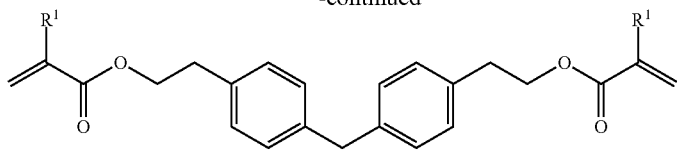

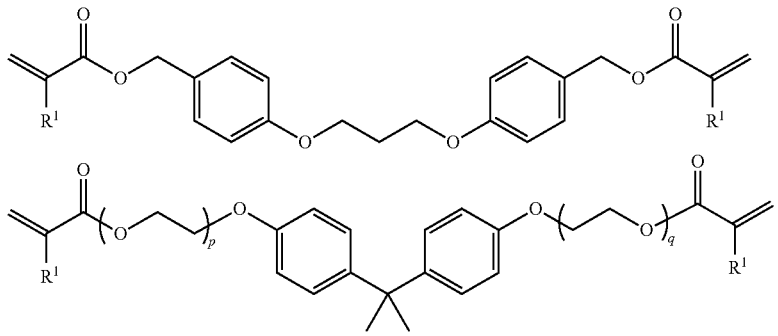

p = 1 - 3    q = 1 - 3

Polymerizable Compound Represented by Formula (II-2) Below

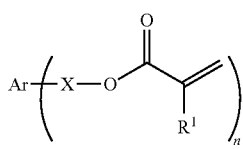
(II-2)

(In the formula, Ar represents an arylene group which may have a substituent, X represents a single bond or organic linking group, $R^1$ represents a hydrogen atom or methyl group, and n is 2 or 3.)

Examples of the arylene group in the formula includes hydrocarbon-based arylene group such as phenylene group and naphthylene group; and heteroarylene group having indole, carbazole or the like as a linking group, wherein the hydrocarbon-based arylene group is preferable, and phenylene group is more preferable from the viewpoints of less viscosity and etching resistance. The arylene group may have a substituent, wherein preferable examples of the substituent include alkyl group, alkoxy group, hydroxy group, cyano group, alkoxycarbonyl group, amide group, and sulfonamide group.

Examples of the organic linking group represented by X include alkylene group, arylene group, and aralkylene group which may contain a hetero atom in the chain thereof. Among them, alkylene group and oxyalkylene group are preferable, and alkylene group is more preferable. X is particularly preferably a single bond or alkylene group.

$R^1$ represents a hydrogen atom or methyl group, and is preferably a hydrogen atom.

n is 2 or 3, and preferably 2.

The polymerizable compound (II-2) is preferably a polymerizable compound represented by the formula (II-2a) or (II-2b) below, in view of lowering the viscosity of the composition.

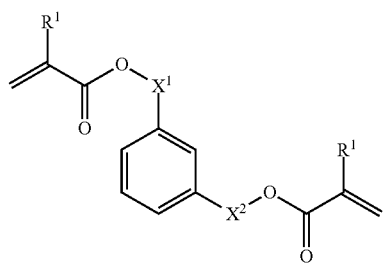
Formula (II-2a)

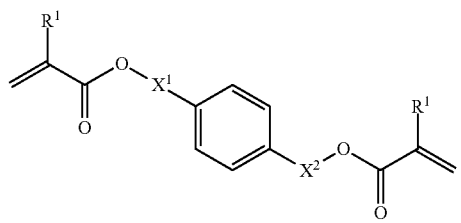
Formula (II-2b)

(In the formula, each of $X^1$ and $X^2$ independently represents an alkylene group which may have a single bond or $C_{1-3}$ substituent, and $R^1$ represents a hydrogen atom or methyl group.)

In the formula (II-2a), $X^1$ is preferably a single bond or methylene group, and more preferably a methylene group in view of lowering the viscosity of the composition.

Preferable ranges of $X^2$ are similar to those of $X^1$.

$R^1$ is synonymous to $R^1$ in the formula, specified by the same preferable ranges.

The polymerizable compound preferably exists in liquid form at 25° C., in view of suppressing deposition of some insoluble matter when the amount of addition thereof increases.

Specific examples of the polymerizable compound represented by the formula (II-2) will be shown below. $R^1$ is synonymous to $R^1$ in the formula, and represents a hydrogen atom or methyl group. Note that the present invention is not limited to these specific examples.

23
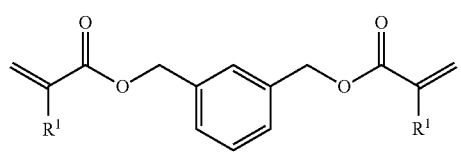
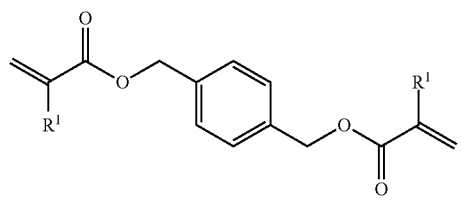
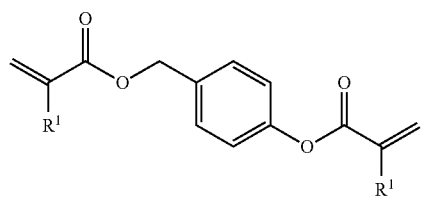
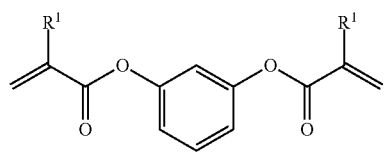
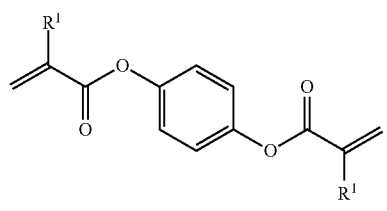
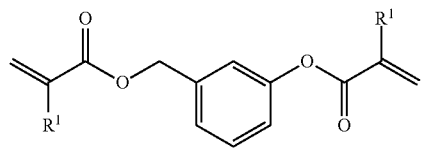
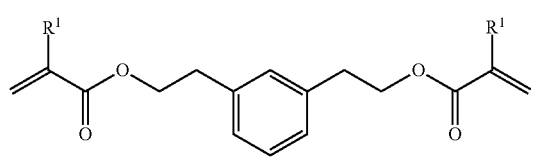
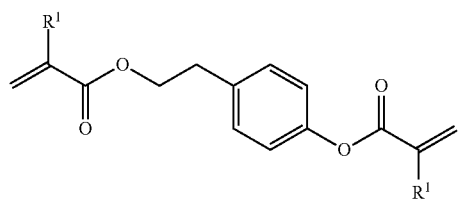
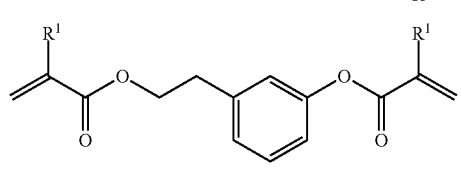
24
-continued
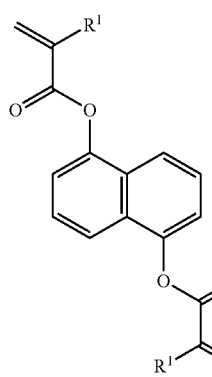
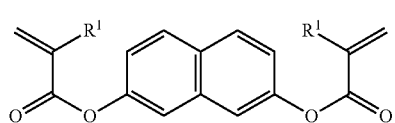
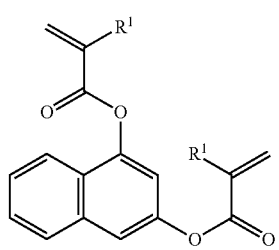
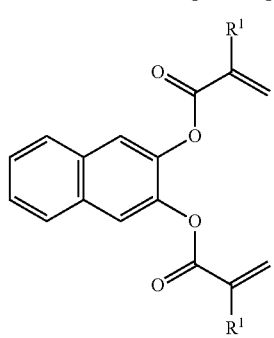
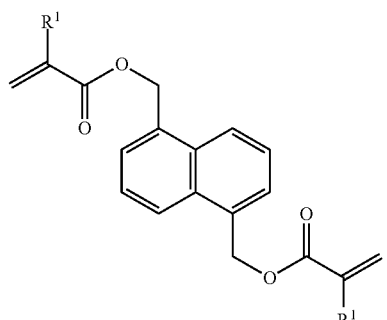
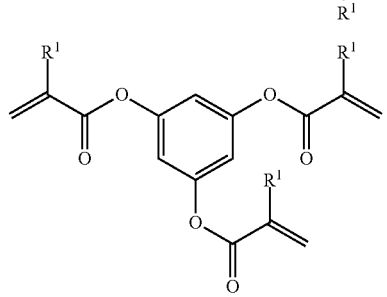

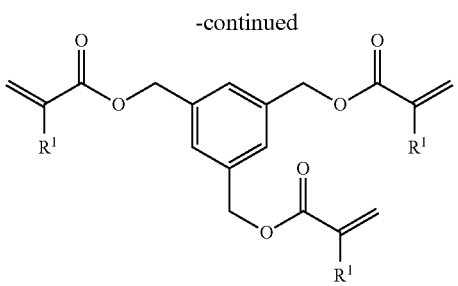

More preferable examples of the polymerizable compound having an aromatic group, used for the photo-curable composition of the present invention, will be enumerated below, without limiting the present invention.

Preferable examples of the polymerizable compound having an aromatic group include benzyl(meth)acrylate which is unsubstituted or has a substituent on the aromatic ring thereof, phenethyl(meth)acrylate which is unsubstituted or has a substituent on the aromatic ring thereof, phenoxyethyl (meth)acrylate which is unsubstituted or has a substituent on the aromatic ring thereof, 1- or 2-naphthyl(meth)acrylate which is unsubstituted or has a substituent on the aromatic ring thereof, 1- or 2-naphthylmethyl(meth)acrylate which is unsubstituted or has a substituent on the aromatic ring thereof, 1- or 2-naphthylethyl(meth)acrylate which is unsubstituted or has a substituent on the aromatic ring thereof, 1- or 2-naphthoxyethyl(meth)acrylate, resolcinol di(meth)acrylate, m-xylylene di(meth)acrylate, naphthalene di(meth)acrylate, and ethoxylated bisphenol A diacrylate. More preferable examples include benzyl acrylate which is unsubstituted or has a substituent on the aromatic ring thereof, 1- or 2-naphthylmethyl acrylate, and m-xylylene diacrylate.

(A2) Polymerizable Compound Having at Least Either One of Fluorine Atom and Silicon Atom The composition of the present invention preferably contains a polymerizable compound having at least either one of fluorine atom and silicon atom. Examples of these compounds will be enumerated below.

(A2-1) Polymerizable Compound Having at Least One of Fluorine Atom and Silicon Atom, for Improved Mold Releasing Property In the present invention, for the purpose of improving mold releasing property, a polymerizable compound having at least either one of fluorine atom and silicon atom may be added. By adding such compound, a good mold releasing property may be obtained without using surfactant.

The (A2) polymerizable compound having at least either one of fluorine atom and silicon atom of the present invention is a compound having at least one group having a fluorine atom, silicon atom, or, both of fluorine atom and silicon atom, and at least one polymerizable functional group. The polymerizable functional group is preferably a methacryloyl group, epoxy group, or vinyl ether group.

The (A2) polymerizable compound having at least either one of fluorine atom and silicon atom may be a low-molecular-weight compound or polymer.

When the (A2) polymerizable compound having at least either one of fluorine atom and silicon atom is a polymer, it may have a repeating unit having at least either one of fluorine atom and silicon atom, and a repeating unit, as a copolymerizing component, having a polymerizable group in the side chain thereof. Alternatively, the repeating unit having at least either one of fluorine atom and silicon atom may have a polymerizable group in the side chain thereof, and in particular, at the terminal thereof. In this case, while the skeleton of the repeating unit having at least either one of fluorine atom and silicon atom is not specifically limited without departing from the gist of the present invention, the repeating unit preferably has a skeleton typically derived from an ethylenic unsaturated group-containing group, and more preferably has a (meth)acrylate skeleton. The repeating unit having a silicon atom may have the silicon atom in the skeleton thereof, such as in a siloxane structure (dimethylsiloxane structure, for example). The weight average molecular weight is preferably 2,000 to 100,000, more preferably 3000 to 70,000, and particularly preferably 5,000 to 40,000.

Polymerizable Compound Having Fluorine Atom

The fluorine atom-containing group owned by the fluorine atom-containing polymerizable compound is preferably selected from fluoroalkyl group and fluoroalkyl ether group. The fluoroalkyl group is preferably a fluoroalkyl group having carbon atoms of 2 to 20, and a fluoroalkyl group having carbon atoms of 4 to 8. Preferable examples of fluoroalkyl group include trifluoromethyl group, pentafluoroethyl group, heptafluoropropyl group, hexafluoroisopropyl group, nonafluorobutyl group, tridecafluorohexyl group, and heptadecafluorooctyl group.

The polymerizable compound having fluorine atom (A2) is preferably a polymerizable compound having trifluoromethyl group. By virtue of the trifluoromethyl group structure, the effects of the present invention may be expressed only with a small amount of addition (10% by mass or less, for example), so that compatibility with other components may be improved, line edge roughness after dry etching may be improved, and formability of repetitive pattern may be improved.

The fluoroalkyl ether group preferably has a trifluoromethyl group, similarly to the fluoroalkyl group, which may be exemplified by perfluoroethylenoxy group and perfluoropropyleneoxy group. Preferable examples are those having a fluoroalkyl ether unit having a trifluoromethyl group such as —(CF (CF$_3$)CF$_2$O)—, and/or those having a trifluoromethyl group at the terminal of the fluoroalkyl ether group.

The total number of fluorine atoms per one molecule, owned by the polymerizable compound, having at least either one of fluorine atom and silicon atom (A2), is preferably 6 to 60, more preferably 9 to 40, even more preferably 12 to 40, still more preferably 12 to 20.

The polymerizable compound having at least either one of fluorine atom has a fluorine content, defined below, of 20 to 60%, more preferably 30 to 60%, and still more preferably 35 to 60%. By adjusting the fluorine content in the appropriate range, the curable composition may be improved in compatibility with other components, less causative of fouling on mold, improved in the line edge roughness after dry etching, and improved in the formability of repetitive pattern transfer.

In this patent specification, the fluorine content is given by the equation below:

Fluorine content=[{(Number of fluorine atoms in polymerizable compound)×(atomic weight of fluorine atom)}/(molecular weight of polymerizable compound)]×100

As a preferable example of the fluorine atom-containing of polymerizable compound, having at least either one of fluorine atom and silicon atom, a compound having a partial structure represented by formula (I) below may be exemplified. By adopting a compound having such partial structure, the curable composition having an excellent formability of pattern, even after repetitive pattern transfer, may be obtained, and stability over time of the composition may be improved.

$$—CH_2CH_2—C_nF_{2n+1} \quad \text{Formula (I)}$$

In formula (I), n represents an integer of 1 to 8, and preferably 4 to 6.

One preferable example of the polymerizable compound having fluorine atom is exemplified by a compound having a partial structure represented by the following formula (II). Of course, the polymerizable compound having fluorine atom may have both of the partial structure represented by the following formula (I) and the partial structure represented by the following formula (II).

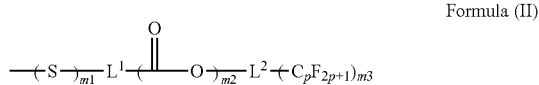

Formula (II)

(In the formula (II), $L^1$ represents a single bond, or an alkylene group having carbon atoms of 1 to 8, $L^2$ represents an alkylene group having carbon atoms of 1 to 8, m1 and m2 each represent 0 or 1, wherein at least one of m1 and m2 is 1, m2 is an integer of 1 to 3, p is an integer of 1 to 8, and when m3 is 2 or more, each of $—C_pF_{2p+1}$ may be the same or different to each other.)

The above $L^1$ and $L^2$ each preferably are an alkylene group having carbon atoms of 1 to 4. The alkylene group may have a substituent without diverting the scope of the gist of the present invention. The above m3 is preferably 1 or 2. The above p is preferably an integer of 4 to 6.

As the fluorine atom-containing polymerizable compound, exemplified are fluorine atom-containing monofunctional polymerizable compound such as 2,2,2-trifluoroethyl (meth)acrylate, pentafluoroethyl(meth)acrylate, 2-(perfluorobutyl) ethyl(meth)acrylate, 3-perfluorobutyl-2-hydroxypropyl(meth)acrylate, 2-(perfluorohexyl)ethyl (meth)acrylate, 2,2,3,3,4,4,5,5-octafluoropentyl(meth)acrylate, 2-(perfluorooctylethyl(meth)acrylate, 2,2,3,3-tetrafluoropropyl(meth)acrylate, and 2,2,3,3,4,4-hexafluorobutyl(meth)acrylate. Also multi-functional polymerizable compound having two or more polymerizable functional groups, such as those having di(meth)acrylate structure having fluoroalkylene group, exemplified by 2,2,3,3,4,4-hexafluoropentane-1,5-diol di(meth)acrylate and 2,2,3,3,4,4,5,5-octafluorohexane-1,6-diol di(meth)acrylate, may be preferable examples of the fluorine atom-containing polymerizable compound.

Also compounds having two or more fluorine-containing groups, such as fluoroalkyl group and fluoroalkyl ether group, in one molecule may preferably be used.

The compound having two of fluoroalkyl groups and/or fluoroalkyl ether groups in one molecule is preferably represented by the following formula (III);

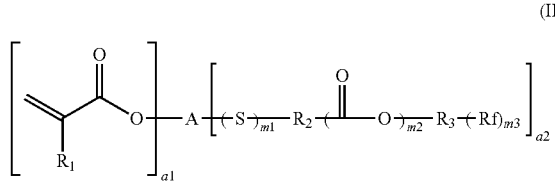

wherein $R^1$ represents a hydrogen atom, an alkyl group, a halogen atom, or a cyano group, preferably a hydrogen atom, or an alkyl group, more preferably a hydrogen atom, or methyl group; A is a (a1+a2)-valent linking group, preferably a linking group having an alkylene group and/or an arylene group, which may have a linking group comprising a hetero atom. Examples of the linking group having a hetero atom include —O—, —C(=O)O—, —S—, —C(=O)—, —NH—. Those groups may have a substituent, but preferably a group not having a substituent. A preferably has 2 to 50 carbon atoms, more preferably represents 4 to 15.

a1 represents an integer of 1 to 6, preferably 1 to 3, and more preferably 1 or 2.

a2 represents an integer of 2 to 6, preferably 2 or 3, and more preferably 2.

$R^2$ and $R^3$ each represent a single bond or an alkylene group having a carbon atoms of 1 to 8. m1 and m2 each represent 0 or 1. m3 represents an integer of 1 to 3.

When a1 is 2, the individual (A)s may be same with, or different from each other.

When a2 is 2 or larger, each of $R^2$, $R^3$, m1, m2, m3, m4, m5 and n may be same with, or different from each other.

Rf represents a fluoroalkyl group or a fluoroalkyl ether group, preferably a fluoroalkyl group having carbon atoms of 1 to 8, and a fluoroalkyl ether group having carbon atoms of 3 to 20.

When the polymerizable compound having fluorine atom is a polymer, a polymer comprising a repeating unit derived from the above polymerizable compound having fluorine atom is preferable.

While the content of the polymerizable monomer, having at least either one of fluorine atom and silicon atom, in the curable composition for imprints of the present invention is not specifically restricted, it is preferably 0.1 to 20% by mass of the total polymerizable monomer, preferably 0.2 to 15% by mass, more preferably 0.5 to 10% by mass, and particularly preferably 0.5 to 5% by mass, in view of improving curability and reducing the viscosity of the composition.

Specific examples of the polymerizable compound having fluorine atom used for the curable composition for imprints of the present invention will be given below, without restricting the present invention. $R^1$ in the formulae below represents any of hydrogen atom, alkyl group, halogen atom and cyano group.

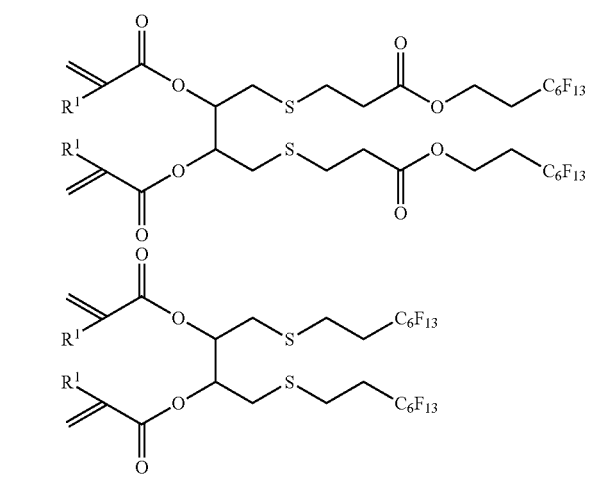

-continued
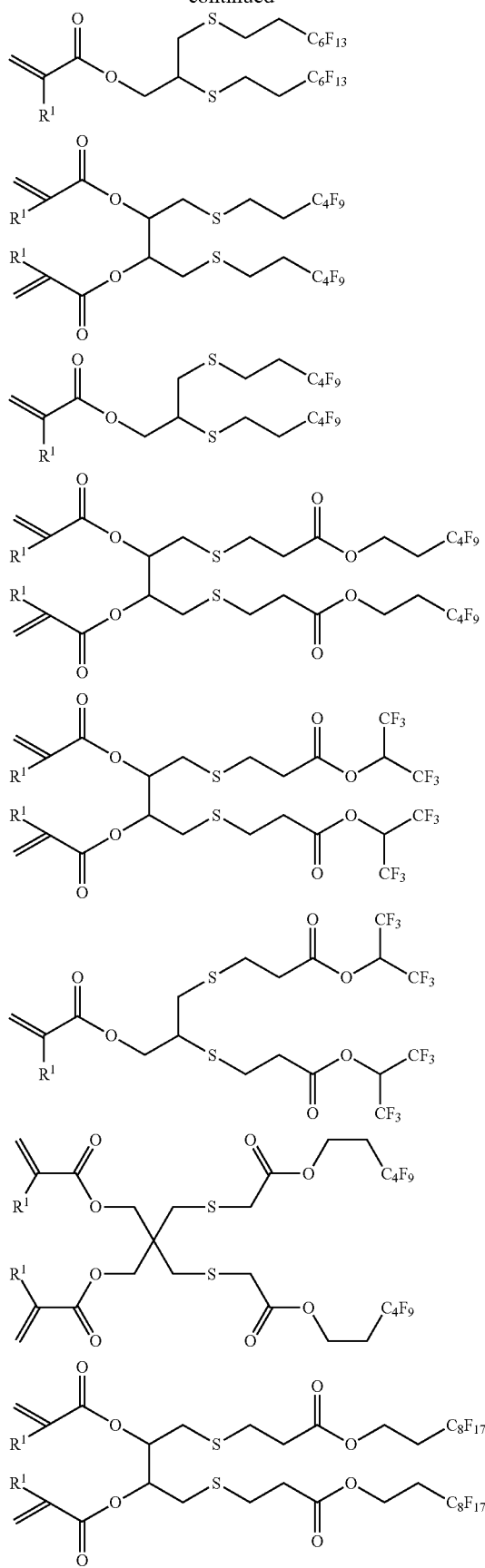
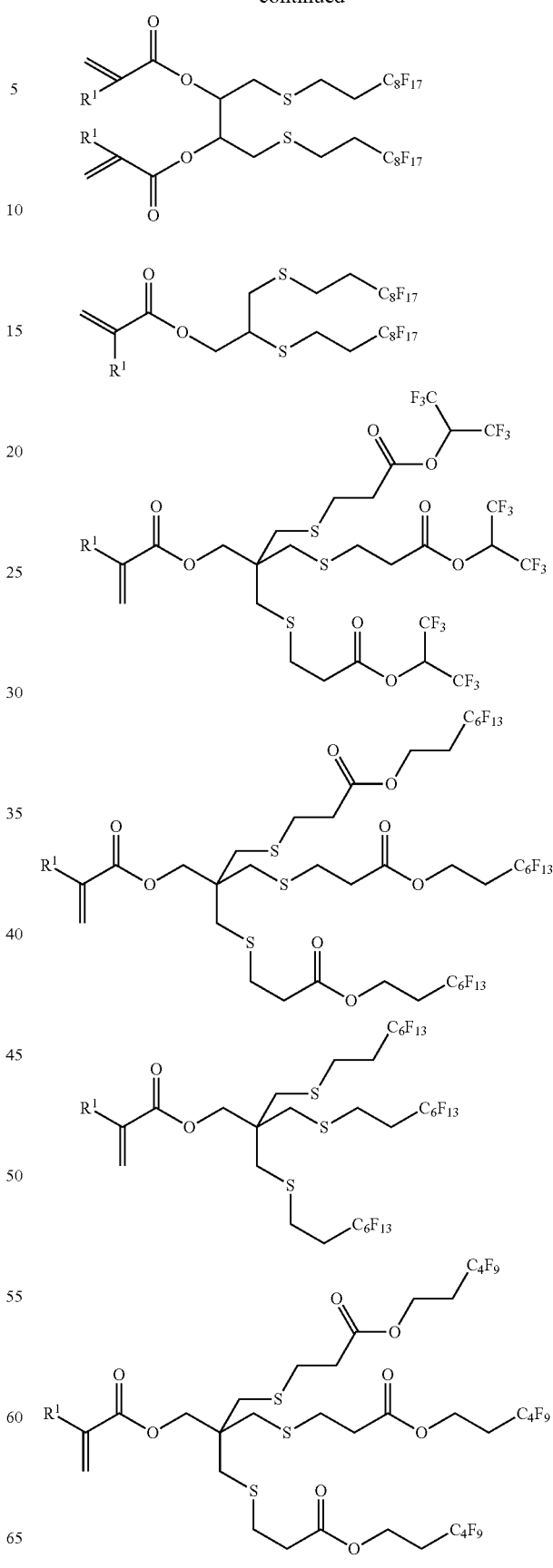

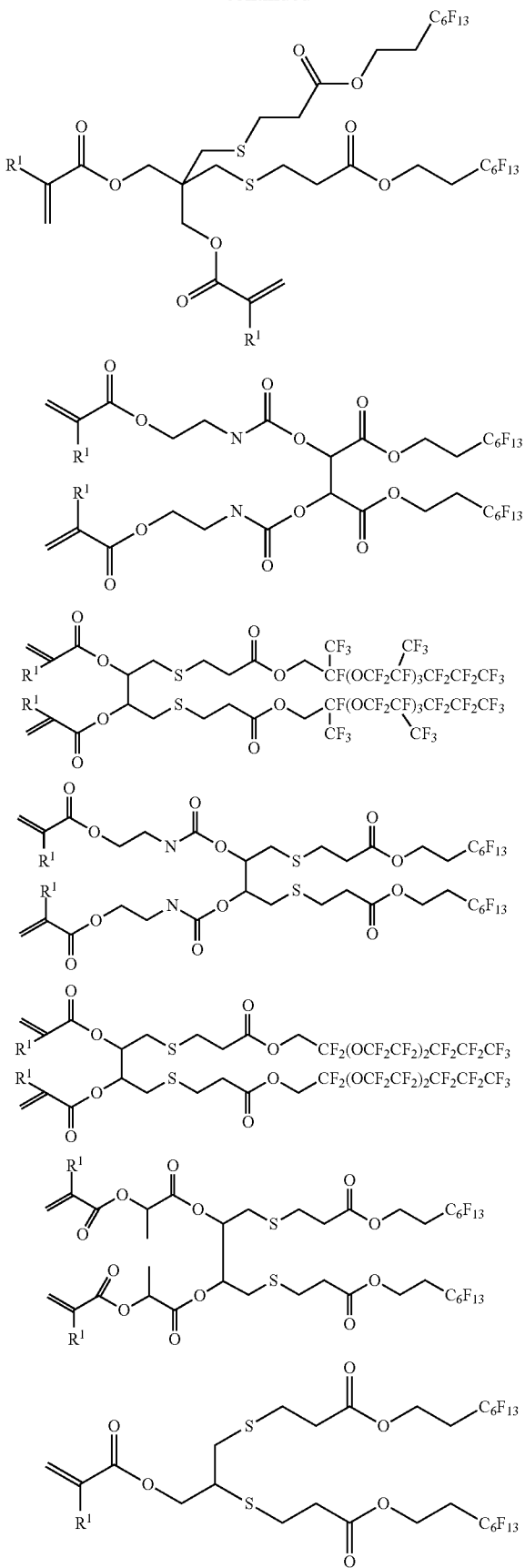

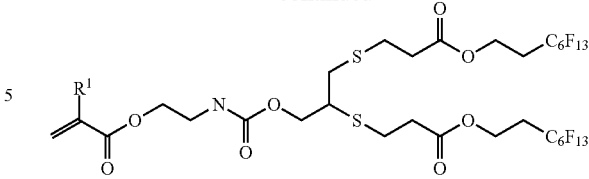

Polymerizable Monomer Having Silicon Atom

A silicon-containing functional group that the above polymerizable monomer having silicon atom has is exemplified by a trialkyl silyl group, a trialkylsilyl group, a chain-like siloxane structure, a circular siloxane structure, and a cage-type siloxane structure. From the viewpoints of compatibility and mold releasability, it is preferable a trimethylsilyl group, or a functional group having a dimethylsiloxane structure.

The silicon atom-containing polymerizable monomer may be exemplified by 3-tris(trimethylsilyloxy) silylpropyl (meth)acrylate, trimethylsilylethyl(meth)acrylate, (meth)acryloylmethylbis(trimethylsiloxy)methyl silane, (meth)acryloxymethyl tris(trimethylsiloxy)silane, 3-(meth)acryloxypropyl bis(trimethylsiloxy)methyl silane, a polysiloxane having a (meth)acryloyl group at a terminal or at a side chain which is exemplified by X-22-164 series, X-22-174DX, X-22-2426 and X-22-2475 manufactured by Shin-Etsu Chemical Co., Ltd.

The polymerizable compound preferably contains a polymerizable compound having an alicyclic hydrocarbon group and/or aromatic group, and more preferably contains a polymerizable compound having an alicyclic hydrocarbon group and/or aromatic group and a polymerizable compound having a silicon atom and/or fluorine atom. The total content of the polymerizable compound having an alicyclic hydrocarbon group and/or aromatic group and the polymerizable compound having a silicon atom and/or fluorine atom, relative to the total mass of polymerizable components contained in the photo-curable composition of the present invention, is preferably 30 to 100% by mass, more preferably 70 to 100% by mass, and still more preferably 90 to 100% by mass.

In a still more preferable embodiment, the content of a (meth)acrylate polymerizable compound having an aromatic group, as the polymerizable compound, is 70 to 100% by mass of the total polymerizable components, more preferably 90 to 100% by mass, and particularly preferably 95 to 100% by mass.

In a particularly preferable embodiment, the content of the polymerizable compound (1) shown below is 0 to 80% by mass (more preferably 20 to 70% by mass) of the total polymerizable components, the content of the polymerizable compound (2) shown below is 20 to 100% by mass (more preferably 30 to 80% by mass) of the total polymerizable components, and the content of the polymerizable compound (3) shown below is 0 to 10% by mass (more preferably 0.1 to 6% by mass) of the total polymerizable components:

(1) polymerizable compound having an aromatic group (preferably phenyl group or naphthyl group, and more preferably naphthyl group), and one (meth)acrylate group;

(2) polymerizable compound having an aromatic group (preferably phenyl group or naphthyl group, and more preferably phenyl group), and two (meth)acrylate groups; and (3) polymerizable compound having at least either one of fluorine atom and silicon atom, and a (meth)acrylate group.

In the photo-curable composition, content of a polymerizable compound having a viscosity at 25° C. of smaller than 5 mPa·s is preferably 50% by mass or less of the total polymerizable compound, more preferably 30% by mass or less, and still more preferably 10% by mass or less. By adjusting the viscosity in the above-described ranges, stability of ejection in inkjet process may be improved, and thereby defects of transfer in the imprinting process may be reduced.

(B) Photo-Polymerization Initiator

The curable composition for imprints of the present invention contains a photo-polymerization initiator. The photo-polymerization initiator used in the present invention may be anything so far as it can generate, upon irradiation of light, an active species which promotes polymerization of the polymerizable monomer (A). The photo-polymerization initiator may be exemplified by cationic polymerization initiator and radical polymerization initiator, wherein the radical polymerization initiator is preferable. In the present invention, a plurality of species of photo-polymerization initiator may be used in combination.

Content of the photo-polymerization initiator used for the present invention, relative to the total composition excluding solvent, is typically 0.01 to 15% by mass, preferably 0.1 to 12% by mass, and still more preferably 0.2 to 7% by mass. For the case where two or more species of photo-polymerization initiators are used, the total amount is adjusted to the above-described ranges.

A content of photo-polymerization initiator of 0.01% by mass or above is preferable since the sensitivity (quick curability), resolution, line edge roughness, and film strength tend to improve. On the other hand, a content of photo-polymerization initiator of 15% by mass or less is preferable since the transmissivity of light, coloration and handlability tend to improve.

Commercially available initiators may be adoptable to the radical photo-polymerization initiator in the present invention. Those described in paragraph [0091] in Japanese-A-2008-105414 may preferably be used. Among them, acetophenone-base compound, acylphosphine oxide-base compound, and oxime ester-base compound are preferable from the viewpoint of curing sensitivity and absorption characteristics.

The acetophenone-base compound may preferably be exemplified by hydroxyacetophenone-base compound, dialkoxyacetophenone-base compound, and aminoacetophenone-base compound. The hydroxyacetophenone-base compound may preferably be exemplified by Irgacure (registered trademark) 2959 (1-[4-(2-hydroxyethoxy) phenyl]-2-hydroxy-2-methyl-1-propanone), Irgacure (registered trademark) 184 (1-hydroxycyclohexylphenylketone), Irgacure (registered trademark) 500 (l-hydroxycyclohexylphenylketone, benzophenone), Darocur (registered trademark) 1173 (2-hydroxy-2-methyl-1-phenyl-1-propanone), all of which are available from Ciba Specialty Chemicals Inc.

The dialkoxyacetophenone-base compound may preferably be exemplified by Irgacure (registered trademark) 651 (2,2-dimethoxy-1,2-diphenylethan-1-one) available from Ciba Specialty Chemicals Inc.

The aminoacetophenone-base compound may preferably be exemplified by Irgacure (registered trademark) 369 (2-benzyl-2-(dimethylamino)-1-(4-morpholinophenyl)-1-butanone), Irgacure (registered trademark) 379 (EG) (2-dimethylamino-2-(4-methylbenzyl)-1-[4-(morpholine-4-yl)-Phenyl]butan-1-one), and Irgacure (registered trademark) 907 (2-methyl-1-[4-(methylthio)phenyl]-2-morpholinopropane-1-one), all of which are available from Ciba Specialty Chemicals Inc.

The acylphosphine oxide-base compound may preferably be exemplified by Irgacure (registered trademark) 819 (bis (2,4,6-trimethylbenzoyl)phenylphosphine oxide), and Irgacure (registered trademark) 1600 (bis(2,6-dimethoxybenzoyl)-2,4,4-trimethylpentylphosphine oxide), all of which are available from Ciba Specialty Chemicals Inc.; and Lucirin TPO ((2,4,6-trimethylbenzoyl)diphenylphosphine oxide), and Lucirin TPO-L ((2,4,6-trimethylbenzoyl)phenylethoxyphosphine oxide), all of which are available from BASF.

The oxime ester-base compound may preferably be exemplified by Irgacure (registered trademark) OXE01 (1,2-octanedione, 1-[4-(phenylthio) phenyl]-, 2-(O-benzoyloxime)), and Irgacure (registered trademark) OXE02 (ethanone, 1-[9-ethyl-6-(2-methylbenzoyl)-9H-carbazole-3-yl]-, 1-(O-acetyloxime)), all of which are available from Ciba Specialty Chemicals Inc.

The cation photo-polymerization initiator adoptable to the present invention is preferably sulfonium salt compound, iodonium salt compound, and oxime sulfonate compound, and may preferably be exemplified by 4-methylphenyl[4-(1-methylethyl) phenyliodonium tetrakis(pentafluorophenyl)borate (PI2074, from Rhodia), 4-methylphenyl[4-(2-methylpropyl)phenyliodonium hexafluorophophate (Irgacure 250, from Ciba Specialty Chemicals Inc.), Irgacure PAG103, 108, 121 and 203 (from Ciba Specialty Chemicals Inc.).

In the invention, "light" includes not only those having with a wavelength falling within a range of ultraviolet, near-ultraviolet, far-ultraviolet, visible, infrared, and electromagnetic waves but also radiations. The radiations include, for example, microwaves, electron beams, EUV, X-rays. In addition, laser rays such as 248 nm excimer laser, 193 nm excimer laser, 172 nm excimer laser are also usable herein. These lights may be monochromatic lights (single wavelength lights) having passed through optical filters, or may be lights of different wavelengths (composite lights). For photoexposure, multiple photoexposure may be employable, and for the purpose of enhancing the film strength and the etching resistance of the composition, entire surface photoexposure may be effected after pattern formation.

Non-Polymerizable Compound (C)

The curable composition of the present invention contains a non-polymerizable compound which has a polyalkylene glycol structure having, at the terminal thereof, at least one hydroxy group or has a polyalkylene glycol structure having, at the terminal thereof, at least one etherified hydroxy group. The non-polymerizable compound contains substantially no fluorine atom and silicon atom.

The non-polymerizable compound herein means a compound having no polymerizable group.

The polyalkylene structure owned by the non-polymerizable compound (C) used in the present invention is preferably a polyalkylene glycol structure having a $C_{1-6}$ alkylene group, polyethylene glycol structure, polypropylene glycol structure, polybutylene glycol structure, or mixed structure of them, wherein polyethylene glycol structure, polypropylene glycol structure, or mixed structure of them is more preferable, and polypropylene glycol structure is particularly preferable.

The non-polymerizable compound is preferably configured substantially by the polyalkylene glycol structure only, except for the terminal substituent. Note that "substantially" herein means that contents of the constituents other than polyalkylene glycol structure is 5% by mass or less, and preferably 1% by mass or less, of the total. In the present invention, it is particularly preferable that a compound substantially composed of polypropylene glycol structure only is contained as the non-polymerizable compound (C).

The polyalkylene glycol structure preferably has 3 to 1000 units of alkylene glycol constitutive unit, and more preferably 4 to 500 units, still more preferably 5 to 100 units, and most preferably 5 to 50 units.

Weight average molecular weight (Mw) of the component (C) is preferably 150 to 10,000, more preferably 200 to 5,000, still more preferably 500 to 4,000, and furthermore preferably 600 to 3,000.

Note that "containing substantially no fluorine atom and silicon atom" typically means that the total content of the fluorine atom and silicon atom is 1% or less. It is preferable that neither fluorine atom nor silicon atom is contained. By virtue of absence of fluorine atom and silicon atom, the component (C) is improved in compatibility with the polymerizable compound, and thereby the curable composition, in particular the one containing no solvent, may be improved in uniformity of coating, patternability in imprints, and line edge roughness after dry etching.

The non-polymerizable compound (C) has, at the terminal thereof, at least one hydroxy group or etherified hydroxy group. Provided that at least one hydroxy group or etherified hydroxy group resides at the terminal, the other terminal may have a hydroxy group, or may have a hydroxy group having the hydrogen atom thereof substituted. Preferable examples of the group possibly substituting the hydrogen atom of the terminal hydroxy group include alkyl group (or polyalkylene glycol alkyl ether), and acyl group (or polyalkylene glycol ester). Polyalkylene glycol having hydroxyl groups at all terminals is more preferable. While compounds having a plurality (preferably 2 or 3) polyalkylene glycol chains bonded via linking group(s) may be used, those having straight chain structures without branching of the polyalkylene glycol chain are more preferable. In particular, diol type polyalkylene glycol is preferable.

Preferable, specific examples of the non-polymerizable compound (C) include polyethylene glycol and polypropylene glycol; mono- or dimethyl ether, mono- or dioctyl ether, mono- or dinonyl ether, mono- or didecyl ether of them; and monostearate, monooleate, monoadipate and monosuccinate of them.

Content of the non-polymerizable compound (C) is preferably 0.1 to 20% by mass of the total composition excluding the solvent, more preferably 0.2 to 10% by mass, still more preferably 0.5 to 5% by mass, and most preferably 0.5 to 3% by mass.

(Other Ingredients)

In accordance with various objects, in addition to the above ingredient, the curable composition for imprints of the invention may contain any other ingredients such as surfactant, antioxidant and polymer without impairing the effect of the invention.

—Surfactant—

Preferably, the curable composition for imprints of the invention comprises a surfactant. The content of the surfactant that may be in the composition may be, for example, from 0.001 to 5% by mass of the composition, preferably from 0.002 to 4% by mass, more preferably from 0.005 to 3% by mass. In case where two or more different types of surfactants are in the composition, the total amount thereof falls within the above range. When the surfactant content in the composition falls from 0.001 to 5% by mass, it is favorable from the viewpoint of the coating uniformity, therefore hardly worsening the mold transferability owing to excessive surfactant.

As the surfactant, preferred are nonionic surfactants. Preferably, the composition comprises at least one of a fluorine-containing surfactant, a silicone-type surfactant and a fluorine-containing silicone-type surfactant. More preferably, the composition comprises both a fluorine-containing surfactant and a silicone-type surfactant, or a fluorine-containing silicone-type surfactant. The most preferably, the composition comprises a fluorine-containing silicone-type surfactant. As the fluorine-containing surfactant and the silicone-type surfactant, preferred are nonionic surfactants.

"Fluorine-containing silicone-type surfactant" as referred to herein means a surfactant satisfying both the requirement of a fluorine-containing surfactant and that of a silicone-type surfactant.

Using the surfactant of the type may solve the problem of coating failures such as striation and flaky pattern formation (drying unevenness of resist film) that may occur when the composition for imprints of the invention is applied onto substrates on which various films are formed, for example, onto silicon wafers in semiconductor production, or onto glass square substrates, chromium films, molybdenum films, molybdenum alloy films, tantalum films, tantalum alloy films, silicon nitride films, amorphous silicon films, tin oxide-doped indium oxide (ITO) films or tin oxide films in production of liquid-crystal devices. In addition, the surfactant is effective for enhancing the flowability of the composition of the invention in the cavity of a female mold, for enhancing the mold-resist releasability, for enhancing the resist adhesiveness to substrates, and for lowering the viscosity of the composition. In particular, when the above-mentioned surfactant is added to the composition for imprints of the invention, the coating uniformity of the composition can be greatly improved; and in coating with it using a spin coater or a slit scan coater, the composition ensures good coating aptitude irrespective of the size of the substrate to which it is applied.

Examples of the nonionic fluorine-containing surfactant usable in the invention include Fluorad FC-430, FC-431 (Sumitomo 3M's trade names); Surflon S-382 (Asahi Glass's trade name); Eftop EF-122A, 122B, 122C EF-121, EF-126, EF-127, MF-100 (Tochem Products' trade names); PF-636, PF-6320, PF-656, PF-6520 (Omnova Solution's trade names); Futagent FT250, FT251, DFX18 (Neos' trade names); Unidyne DS-401, DS-403, DS-451 (Daikin's trade names); Megafac 171, 172, 173, 178K, 178A, F780F (DIV's trade names).

Examples of the nonionic silicone-type surfactant include SI-10 series (Takemoto Yushi's trade name), Megafac Paintad 31 DIC's trade name), KP-341 (Shin-Etsu Chemical's trade name).

Examples of the fluorine-containing silicone-type surfactant include X-70-090, X-70-091, X-70-092, X-70-093 (Shin-Etsu Chemical's trade names); Megafac R-08, XRB-4 (DIC's trade names).

—Antioxidant—

Preferably, the curable composition for imprints of the invention contains a known antioxidant. The content of the antioxidant to be in the composition is, for example, from 0.01 to 10% by mass of the total amount of the polymerizable monomers constituting the composition, preferably from 0.2 to 5% by mass. When two or more different types of antioxidants are in the composition, the total amount thereof falls within the above range.

The antioxidant is for preventing fading by heat or photoirradiation, and for preventing fading by various gases such as ozone, active hydrogen NOx, SOx (x is an integer), etc. Especially in the invention, the antioxidant added to the composition brings about the advantage that the cured film is prevented from being discolored and the film thickness is prevented from being reduced through decomposition. The antioxidant includes hydrazides, hindered amine-type antioxidants, nitrogen-containing heterocyclic mercapto compounds, thioether-type antioxidants, hindered phenol-type antioxidants, ascorbic acids, zinc sulfate, thiocyanates, thiourea derivatives, saccharides, nitrites, sulfites, thiosulfates, hydroxylamine derivatives, etc. Of those, preferred are hindered phenol-type antioxidants and thioether-type antioxidants from the viewpoint of their effect of preventing cured film discoloration and preventing film thickness reduction.

Commercial products of the antioxidant usable herein include Irganox 1010, 1035, 1076, 1222 (all by Ciba-Geigy); Antigene P, 3C, FR, Sumilizer S, Sumilizer GA80 (by Sumitomo Chemical); Adekastab AO70, AO80, AO503 (by Adeka), etc. These may be used either singly or as combined.

—Polymerization Inhibitor—

Furthermore, the curable composition for imprints of the invention preferably comprises a polymerization inhibitor. The content of the polymerization inhibitor is from 0.001 to 1% by mass, more preferably from 0.005 to 0.5% by mass, and even more preferably from 0.008 to 0.05% by mass, relative to all the polymerizable monomers, and the change in the viscosities over time can be inhibited while maintaining a high curing sensitivity by blending the polymerization inhibitor in an appropriate amount. The polymerization inhibitor may be added at the production of the polymerizable monomer or may be added the curable composition after the production of the polymerizable monomer.

The polymerization inhibitor may be exemplified by hydroquinone, p-methoxyphenol, di-tert-butyl-p-cresol, pyrogallol, tert-butylcatechol, benzoquinone, 4,4'-thiobis(3-methyl-6-tert-butylphenol), 2,2'-methylenebis(4-methyl-6-tert-butylphenol), cerium (III) salt of N-nitrosophenyl hydroxylamine, phenothiazine, phenoxazine, 4-methoxynaphthol, 2,2,6,6-tetramethylpiperidine-1-oxyl, free radical, 2,2,6,6-tetramethylpiperidine, 4-hydroxy-2,2,6,6-tetramethylpiperidine-1-oxyl, free radical, nitrobenzene, and dimethylaniline; among which preferable examples include p-benzoquinone, 2,2,6,5-tetramethylpiperidine-1-oxyl, free radical, 4-hydroxy-2,2,6,6-tetramethylpiperidine-1-oxyl, free radical, and phenothiazine.

—Solvent—

A solvent may be used for the curable composition for imprints of the invention, in accordance with various needs. In particular, when a pattern having a thickness of at most 500 nm is formed, the composition preferably contains a solvent. Preferably, the solvent has a boiling point at normal pressure of from 80 to 200° C. Regarding the type of the solvent, any solvent capable of dissolving the composition may be used. Preferred are solvents having at least any one of an ester structure, a ketone structure, a hydroxyl group and an ether structure. Concretely, the solvent is preferably one or more selected from propylene glycol monomethyl ether acetate, cyclohexanone, 2-heptanone, gamma-butyrolactone, propylene glycol monomethyl ether, ethyl lactate. Most preferred is a solvent containing propylene glycol monomethyl ether acetate as securing coating uniformity.

The content of the solvent in the composition of the present invention may be suitably optimized depending on the viscosity of the constitutive ingredients except the solvent, the coatability of the composition and the intended thickness of the film to be formed. From the viewpoint of the coatability, the solvent content is preferably from 0 to 99% by mass of the composition. When the composition of the present invention is applied onto the substrate by inkjet method, it is preferred that the composition does not substantially contain a solvent (for example 3% by mass or less, preferably 1% by mass or less). On the other hand, when a pattern having a film thickness of 500 nm or less is formed by spin-coating method or the like, the content may be 20 to 99% by mass, preferably to 99% by mass, specifically preferably 70 to 98% by mass. In the present invention, a curable composition not comprising a solvent achieves an extreme effect when the pattern is formed by inkjet.

—Polymer Ingredient—

The composition of the invention may contain a poly-functional oligomer having a larger molecular weight than that of the above-mentioned, other poly-functional monomer within a range capable of attaining the object of the invention, for the purpose of further increasing the crosslinking density of the composition. Examples of the photoradical-polymerizable poly-functional oligomer include various acrylate oligomers such as polyester acrylates, urethane acrylates, polyether acrylates, epoxy acrylates. The amount of the oligomer ingredient to be added to the composition may be preferably from 0 to 30% by mass of the composition except the solvent therein, more preferably from 0 to 20% by mass, even more preferably from 0 to 10% by mass, most preferably from 0 to 5% by mass.

The curable composition for imprints of the present invention may further contain a polymer component, in view of improving the dry etching resistance, imprint suitability and curability. The polymer component preferably has a polymerizable functional group in the side chain thereof. Weight-average molecular weight of the polymer component is preferably 2,000 to 100,000, and more preferably 5,000 to 50,000, in view of compatibility with the polymerizable monomer. Amount of addition of the polymer component, with respect to portion of the composition excluding the solvent, is preferably 0 to 30% by mass, more preferably 0 to 20% by mass, and most preferably 2% by mass or less. Pattern formability may be improved by adjusting the content of polymer component having a molecular weight of 2,000 or larger, with respect to the portion of the curable composition for imprints of the present invention excluding the solvent. From the viewpoint of pattern formability, as least as possible amount of resin component is preferable, and therefore the curable composition preferably contains no polymer component other than those composing the surfactant or trace amounts of additives.

In addition to the above-mentioned ingredients, the curable composition for imprints of the invention may contain, if desired, UV absorbent, light stabilizer, antiaging agent, plasticizer, adhesion promoter, thermal polymerization initiator, colorant, elastomer particles, photoacid enhancer, photobase generator, basic compound, flowability promoter, defoaming agent, dispersant, etc.

The curable composition for imprints of the invention can be produced by mixing the above-mentioned ingredients. The ingredients may be mixed and dissolved to prepare the curable composition, generally at a temperature falling within a range of from 0° C. to 100° C. After the ingredients are mixed, the resulting mixture may be filtered through a filter having a pore size of from 0.003 μm to 5.0 μm to give a solution. The filtration may be effected in plural stages, or may be repeated plural times. The solution once filtered may be again filtered. Not specifically defined, the material of the filter may be any one, for example, polyethylene resin, polypropylene resin, fluororesin, nylon resin, etc.

The viscosity of the curable composition for imprints of the invention, except the solvent therein, at 25° C. is at most 100 mPa·s, more preferably from 1 to 70 mPa·s, even more preferably from 2 to 50 mPa·s, still more preferably from 3 to 30 mPa·s.

[Patterning Method]

The patterning method (especially micropatterning method) of using the curable composition for imprints of the invention is described below. The patterning method of the invention comprises applying the curable composition for imprints of the invention onto a substrate or a support (base) to form a patterning layer thereon; pressing a mold against the surface of the patterning layer; and irradiating the patterning layer with light, thereby curing the composition of the invention to form a micropattern.

Preferably, the curable composition for imprints of the invention is, after irradiated with light, further heated and cured. Concretely, at least the composition of the invention is applied onto a substrate (base or support) and optionally dried to form a layer comprising the composition of the invention (patterning layer), thereby preparing a pattern acceptor (having the patterning layer formed on the substrate), then a mold is pressed against the surface of the patterning layer of the pattern acceptor to thereby transfer the mold pattern onto the pattern acceptor, and the resulting micropatterned layer is cured through photoirradiation. The photoimprint lithography of the patterning method of the invention may enable lamination and multi-layer patterning, and therefore may be combined with ordinary thermal imprint technology.

The curable composition for imprints of the invention may form a finer micropattern through photoimprint lithography, at low cost and with high accuracy. Accordingly, the composition of the invention can form micropatterns heretofore formed according to conventional lithography at low cost and with high accuracy. For example, when the composition of the invention is applied onto a substrate and the composition layer is exposed to light, cured and optionally dried (baked), then permanent films of overcoat layers or insulating films for use in liquid-crystal displays (LCD) may be formed and the formed films may be used as an etching resist in producing semiconductor integrated circuits, recording materials or flat panel displays. Particularly, the pattern formed by using the curable composition or imprints is excellent in etching properties and is preferably used for an etching resist for dry-etching which uses fluorocarbon etc.

In permanent films (resists for structural members) for use in liquid-crystal displays (LCD) and in resists for use for substrate processing for electronic materials, the resist is preferably prevented from being contaminated as much as possible with metallic or organic ionic impurities in order that the resist does not interfere with the performance of the products. Accordingly, the concentration of the metallic or organic ionic impurities in the curable composition for imprints of the invention is preferably at most 1 ppm, more preferably at most 100 ppb, even more preferably at most 10 ppb.

The patterning method (pattern transferring method) with the curable composition for imprints of the invention is described concretely hereinunder.

In the patterning method of the invention, the composition of the invention is first applied (preferably coated) onto a support to form a patterning layer thereon.

As the method for providing the curable composition for imprints of the invention, a dip coating method, an air knife coating method, a curtain coating method, a wire bar coating method, a gravure coating method, an extrusion coating method, a spin coating method, a slit scanning method, an inkjet method, etc can be used to form a coated membrane or liquid particles on the substrate. The thickness of the patterning method of the composition of the invention may vary depending on the use thereof, and may be from 0.03 μm to 30 μm or so. The composition of the invention may be applied in a mode of multilayer coating. In the inkjet method and the like, the amount of a liquid particle provided on the substrate is preferably about 1 pl to about 20 pl. Between the substrate and the patterning method of the composition of the invention, any other organic layer may be formed, such as a planarizing layer, etc. With that, the patterning layer is not kept in direct contact with the substrate, and therefore, the substrate may be prevented from being contaminated with dust or from being scratched. The pattern to be formed of the composition of the invention may have good adhesiveness to the organic layer, if any, formed on the substrate.

The substrate (preferably base or support) to which the curable composition for imprints of the invention is applied may be selected from various materials depending on its use, including, for example, quartz, glass, optical film, ceramic material, vapor deposition film, magnetic film, reflective film, metal substrate of Ni, Cu, Cr, Fe or the like, paper, SOG (spin on glass), polymer substrate such as polyester film, polycarbonate film or polyimide film, TFT array substrate, PDP electrode plate, glass or transparent plastic substrate, electroconductive substrate of ITO, metal or the like, insulating substrate, semiconductor substrate such as silicon, silicon nitride, polysilicon, silicon oxide or amorphous silicon, which, however, are not limitative. Among them, preferred is a substrate that is reactive with a silane coupling agent, more preferred is a substrate that is capable to forming a siloxane bond with a silane coupling agent, particularly preferred is a substrate containing silicon atom, especially a silicon substrate and a glass substrate, as the substrate to which the curable composition for imprints of the invention is applied. The shape of the substrate is not also specifically defined. It may be tabular or roll. As described below, the substrate may be light-transmissive or non-light-transmissive, depending on the combination thereof with a mold.

Next, in the patterning method of the invention, a mold is pressed against the surface of the patterning layer in order to transfer the pattern onto the patterning layer whereby a micropattern formed on the pressing surface of the mold can be transferred to the patterning layer.

The composition of the invention can be used to form the pattern on the mold and it can be pressed on the surface of the patterning layer in a substrate.

The mold material usable in the invention is described. In the photoimprint lithography with the composition of the invention, a light-transmissive material is selected for at least one of the mold material and/or the substrate. In the photoimprint lithography applied to the invention, the curable composition for imprints of the invention is applied onto a substrate to form a patterning layer thereon, and a light-transmissive mold is pressed against the surface of the layer, then this is irradiated with light from the back of the mold and the patterning layer is thereby cured. Alternatively, the curable composition for imprints of the invention is provided onto a light-transmissive substrate, then a mold is pressed against it, and this is irradiated with light from the back of the substrate whereby the curable composition for imprints of the invention can be cured.

As the mold that can be used in the invention, a mold having a transferable pattern formed thereon is used. The pattern on the mold may be formed, for example, through photolithography, electronic beam lithography, or the like according to the desired processing accuracy, but in the invention, the mold patterning method is not specifically defined. Even if a pattern is transferred by using a mold having the smallest pattern size of 50 nm or less, the curable composition of the present invention can provide good patternability.

Not specifically defined, the light-transmissive mold material for use in the invention may be any one having a desired strength and durability. Concretely, its examples include glass, quartz, light-transparent resin such as PMMA or polycarbonate resin, transparent metal deposition film, flexible film of polydimethylsiloxane or the like, photocured film, metal film, etc.

The non-light-transmissive mold that can be used in the invention when a light-transmissive mold material is used is not also specifically defined and may be any one having a predetermined strength. Concretely, examples of the mold material include ceramic material, deposition film, magnetic film, reflective film, metal material of Ni, Cu, Cr, Fe or the like, as well as SiC, silicon, silicon nitride, polysilicon, silicon oxide, amorphous silicon, etc. However, these are not limitative. The shape of the mold is not also specifically defined, and may be any of a tabular mold or a roll mold. The roll mold is used especially when continuous transfer in patterning is desired.

The mold that can be used in the patterning method of the invention may be subjected to release treatment for the purpose of further enhancing the releasability of the curable composition for imprint of the invention from the surface of the mold. Such a release treatment of the mold includes, for example, a treatment by a silicone-based, or fluorine-based. Commercial release agents such as Optool DSX manufactured by Daikin Industries, Ltd., Novec EGC-1720 manufactured by Sumitomo 3M Limited, and the like can be suitably used for the release treatment of the mold. The curable composition of the present invention can exhibit excellent patternability even if a mold in which release treatment is not conducted is used.

In case where the photoimprint lithography is performed using the composition of the invention, the patterning method of the invention is generally preferably performed at a mold pressure of 10 MPa or less. By setting the mold pressure at 10 MPa or less, the mold and the substrate become hard to deform and the patterning accuracy tends to increase. Furthermore, since the applied pressure is low, the device tends to be small-sized and thereby preferable. The mold pressure is preferably determined so that the residual film of the composition for imprints in the mold projections can be reduced, and thus the uniformity in the mold transfer is ensured.

In the patterning method of the invention, the dose of photoirradiation in the step of irradiating the patterning layer with light may be sufficiently larger than the dose necessary for curing. The dose necessary for curing may be suitably determined depending on the degree of consumption of the unsaturated bonds in the curable composition and on the tackiness of the cured film as previously determined.

In the photoimprint lithography applied to the invention, the substrate temperature in photoirradiation may be room temperature; however, the photoirradiation may be attained under heat for enhancing the reactivity. In the previous stage of photoirradiation, preferably, the system is kept in vacuum as effective for preventing contamination with bubbles or contamination with oxygen or for preventing the reduction in reactivity, and as effective for enhancing the adhesiveness of the curable composition with mold. The system may be subjected to photoirradiation while still kept in vacuum. In the patterning method of the invention, the vacuum degree in photoirradiation is preferably from $10^{-1}$ Pa to ordinary pressure.

Light to be used for photoirradiation to cure the composition for imprints of the invention is not specifically defined. For example, it includes light and irradiations with a wavelength falling within a range of high-energy ionizing radiation, near-ultraviolet, far-ultraviolet, visible, infrared, etc. The high-energy ionizing radiation source includes, for example, accelerators such as Cockcroft accelerator, Handegraf accelerator, linear accelerator, betatoron, cyclotron, etc. The electron beams accelerated by such an accelerator are used most conveniently and most economically; but also are any other radioisotopes and other radiations from nuclear reactors, such as γ rays, X rays, α rays, neutron beams, proton beams, etc. The UV sources include, for example, UV fluorescent lamp, low-pressure mercury lamp, high-pressure mercury lamp, ultra-high-pressure mercury lamp, xenon lamp, carbon arc lamp, solar lamp, etc. The radiations include microwaves, EUV, etc. In addition, laser rays for use in microprocessing of semiconductors, such as LED, semiconductor laser ray, 248 nm KrF excimer laser ray, 193 nm ArF excimer laser ray and others, are also favorably used in the invention. These lights may be monochromatic lights, or may also be lights of different wavelengths (mixed lights).

In photoexposure, the light intensity is preferably within a range of from 1 mW/cm$^2$ to 50 mW/cm$^2$. When the light intensity is at least 1 mW/cm$^2$, then the producibility may increase since the photoexposure time may be reduced; and when the light intensity is at most 50 mW/cm$^2$, then it is favorable since the properties of the permanent film formed may be prevented from being degraded owing to side reaction. Also preferably, the dose in photoexposure is within a range of from 5 mJ/cm$^2$ to 1000 mJ/cm$^2$. When the dose is less than 5 mJ/cm$^2$, then the photoexposure margin may be narrow and there may occur problems in that the photocuring may be insufficient and the unreacted matter may adhere to mold. On the other hand, when the dose is more than 1000 mJ/cm$^2$, then the composition may decompose and the permanent film formed may be degraded.

Further, in photoexposure, the oxygen concentration in the atmosphere may be controlled to be less than 100 mg/L by introducing an inert gas such as nitrogen or argon into the system for preventing the radical polymerization from being retarded by oxygen.

In the patterning method of the invention, after the pattern layer is cured through photoirradiation, if desired, the cured pattern may be further cured under heat given thereto. The method may additionally includes the post-curing step. Thermal curing of the composition of the invention after photoirradiation is preferably attained at 150 to 280° C., more preferably at 200 to 250° C. The heating time is preferably from 5 to 60 minutes, more preferably from 15 to 45 minutes.

[Pattern]

The pattern thus formed according to the patterning method of the invention as described in the above can be used as a permanent film (resist for structural members) for use in liquid-crystal displays (LCD) and others, or as an etching resist. After its production, the permanent film may be bottled in a container such as a gallon bottle or a coated bottle, and may be transported or stored. In this case, the container may be purged with an inert gas such as nitrogen, argon or the like for preventing the composition therein from being degraded. The composition may be transported or stored at ordinary temperature, but for preventing the permanent film from being degraded, it is preferably transported or stored at a controlled temperature of from −20° C. to 0° C. Needless-to-say, the composition is shielded from light to such a level on which its reaction does not go on.

The pattern formed according to the patterning method of the invention is useful as an etching resist. In case where the curable composition for imprints of the invention is sued as an etching resist, first, the composition of the invention is applied onto a substrate, for example, a silicon wafer or the like with a thin film of $SiO_2$ or the like formed thereon, and patterned according to the patterning method of the invention to thereby form a nano-order micropattern on the substrate. Subsequently, this is wet-etched with hydrogen fluoride or the like, or dry-etched with an etching gas such as $CF_4$ or the like, thereby forming a desired pattern on the substrate. Preferably, the curable composition for imprints of the invention has good etching resistance in dry etching with carbon fluoride or the like.

EXAMPLES

The characteristics of the invention are described more concretely with reference to Production Examples and Examples given below. In the following Examples, the material used, its amount and the ratio, the details of the treatment and the treatment process may be suitably modified or changed not overstepping the scope of the invention. Accordingly, the invention should not be limitatively interpreted by the Examples mentioned below.

(Preparation of Curable Composition)

Ingredients listed in Tables below were mixed, to the mixtures, 200 ppm (0.02% by mass), relative to the polymerizable compound, of 4-hydroxy-2,2,6,6-tetramethylpiperidine-1-oxyl, free radical (from Tokyo Chemical Industry Co. Ltd.), as a polymerization inhibitor was further added, to thereby prepare compositions of the present invention A1 to A11, and comparative compositions B1 to B4. Each composition was filtered through a 0.1 μm polytetrafluoroethylene filter. Note that amounts shown in Tables are given in ratio by weight.

<Polymerizable Compound (A)>
R-1: Benzyl acrylate (Biscoat #160, from Osaka Organic Chemical Industry Ltd.)
R-2: 2-Naphthylmethyl acrylate (synthesized by a general method using 2-bromomethylnaphthalene and acrylic acid)
R-3: Ethylene glycol diacrylate (from Aldrich)
R-4: m-Xylylene diacrylate (synthesized by a general method using α,α'-dichloro-m-xylene and acrylic acid)
R-5: Isobornyl acrylate (IBXA, from Osaka Organic Chemical Industry Ltd.)
R-6: (3-Acryloxypropyl)tris(trimethylsiloxy)silane (SIA0210, from Gelest, Inc.)
R-7: Tricyclodecane dimethanol diacrylate (A-DCP, from Shin-Nakamura Chemical Co. Ltd.)
R-8: 2-(Perfluorohexyl)ethyl acrylate (from Kanto Chemical Co. Inc.)
R-9: Synthesized by the method described in JP-A-2010-239121
R-10: 1,4-Butanediol diacrylate (Biscoat #195, from Osaka Organic Chemical Industry Ltd.)
R-11: Neopentyl glycol diacrylate (Light Acrylate NP-A, from Kyoeisha Chemical Co. Ltd.)
R-12: 1,6-Hexanediol diacrylate (Light Acrylate 1.6HX-A, from Kyoeisha Chemical Co. Ltd.)
R-13: 1,9-Nonanediol diacrylate (Light Acrylate 1.9ND-A, from Kyoeisha Chemical Co. Ltd.)
R-14: 2-Phenoxyethyl acrylate (Biscoat #192, from Osaka Organic Chemical Industry Ltd.)

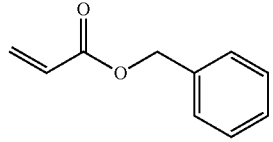

R-1

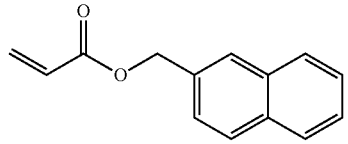

R-2

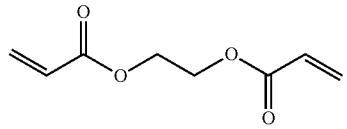

R-3

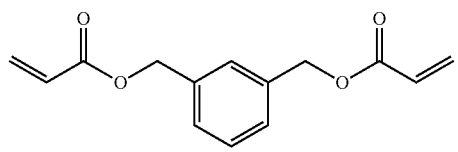

R-4

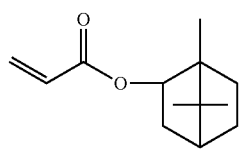

R-5

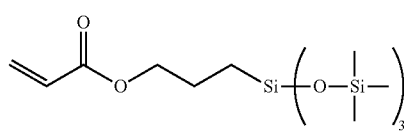

R-6

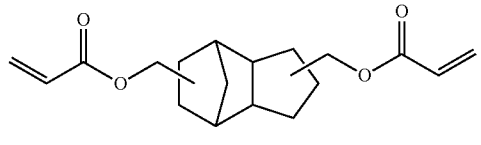

R-7

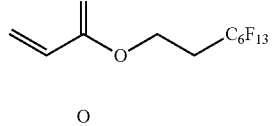

R-8

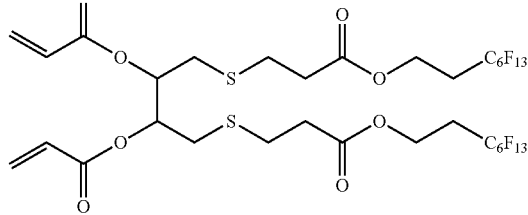

R-9

<Photo-Polymerization Initiator (B)>
P-1: 2-Hydroxy-2-methyl-1-phenyl-1-propanone (Darocur 1173, from BASF)
P-2: 2-(Dimethylamino)-2-(4-methylbenzyl)-1-[4-(morpholine-4-yl)phenyl]butan-1-one (Irgacure 379EG, from BASF)
P-3: 2-Methyl-1-[4-(methylthio)phenyl]-2-(4-morpholinyl)-1-propanone (Irgacure 907, from BASF)

P-4: 1,2-Octanedione, 1-[4-(phenylthio)phenyl]-, 2-(O-benzoyloxime (Irgacure OXE01, from BASF)
P-5: (2,4,6-Trimethylbenzoyl)diphenylphosphine oxide (Lucirin TPO, from BASF)
P-6: Bis(2,4,6-trimethylbenzoyl)phenylphosphine oxide (Irgacure 819, from BASF)
P-7: Irgacure 754 (from BASF)
<Non-Polymerizable Compound (C)>
C-1: Polypropylene glycol (from Wako Pure Chemical Industries, Ltd., diol type, average Mw=700)
C-2: Polypropylene glycol (from Wako Pure Chemical Industries, Ltd., diol type, average Mw=3000)
C-3: Polypropylene glycol (from Wako Pure Chemical Industries, Ltd., triol type, average Mw=700)
C-4: Polyethylene glycol (from Wako Pure Chemical Industries, Ltd., average Mw=600)
C-5: Polyethylene glycol dimethyl ether 250 (from Kanto Chemical Co. Inc.)
C-6: Polyethylene glycol monostearate (25E.O.) (from Wako Pure Chemical Industries, Ltd.)
<Comparative Compound (X)>
(X1) Polyethylene glycol diacrylate (NK Ester A-600, from Shin-Nakamura Chemical Co. Ltd.)
(X2) Polyethylene glycol compound having fluoroalkyl chain (ZONYL-FSO100, from DuPont)
(X3) Polyether-modified silicone oil (TSF-4440, from Momentive Performance Materials Inc.)
(X4) Polyethylene glycol distearate, synthesized from (C-6) polyethylene glycol monostearate and stearic anhydride.
(X5) Fluorine-containing surfactant PF-636 (from OMNOVA Solutions Inc.)
(Evaluation)
The curable compositions for imprints obtained in the individual Examples and Comparative Examples were evaluated as follows. Results are shown in Table 3 below.
<Method of Patterning>
A quartz mold having a 1:1 line-and-space pattern, with a line width of 30 nm, a space depth of 60 nm, and a line edge roughness of 3.0 nm was used.

Using an inkjet printer DMP-2831 from FIJIFILM Dimatix, Inc. as an inkjet device, the photo-curable composition was discharged onto a silicon wafer, while controlling the time interval of discharge so as to deliver 1 picoliter droplet per nozzle to form a 100 μm pitch grid. The temperature of the photo-curable composition to be discharged was adjusted to 25° C. The photo-curable composition was continuously discharged over the entire surfaces of 10 slices of 4-inch wafer, the mold was placed on the wafer under a reduced pressure of 0.1 atm, the stack was irradiated using a mercury lamp with an energy of 300 mJ/cm$^2$, the mold was separated after the exposure of light, to thereby obtain a pattern. Using the same mold and the same method, the pattern transfer was repeated on 10 wafers, and the pattern obtained in the 10th transfer was evaluated as follows.
<Evaluation of Pattern>
The thus-obtained patterns were observed under a scanning electron microscope, and the geometry and defects of pattern were evaluated as follows.
(Geometrical Evaluation)
A: Rectangular pattern exactly replicating the mold obtained.
B: Exact height of pattern, with rounded top.
C: Smaller height of pattern, with rounded top.
(Evaluation of Pattern Defects)
Peeling, chipping, collapse and forth of the pattern were observed.
a: No pattern defect observed.
b: Pattern defects observed in a partial area of less than 2% of the total area.
c: Pattern defects observed in a partial area of 2% or more and less than 5% of the total area.
d: Pattern defects observed in a partial area of 5% or more of the total area.
<Line Edge Roughness (LER) after Dry Etching>
The 10th substrate with the pattern, obtained in the evaluation of patternability in the above, was etched by plasma-assisted dry etching using an Ar/CF$_4$/O$_2$ gas in a dry etcher from Hitachi High-Technoligis Corporation. Portions of the thus-obtained line pattern, free from defects, were observed under a critical-dimension SEM over a length of 5 μm in the longitudinal direction at 50 points, to measure distance from the actual edge from a designed reference line, and to determine a standard deviation and 3σ. The smaller the value is, the better the line edge roughness is. Results are shown in Table below.

TABLE 1

|     | A1 | A2 | A3  | A4  | A5  | A6  | A7  | A8  | A9  | A10 |
|-----|----|----|-----|-----|-----|-----|-----|-----|-----|-----|
| R-1 |    |    | 48  | 48  | 48  |     |     |     |     |     |
| R-2 |    |    |     |     |     | 48  | 48  | 48  | 48  | 48  |
| R-3 |    | 18 | 48  |     |     |     |     |     |     |     |
| R-4 | 95 |    |     | 48  | 48  | 48  | 48  | 48  | 48  |     |
| R-5 |    | 37 |     |     |     |     |     |     |     |     |
| R-6 |    | 37 |     |     |     |     |     |     |     |     |
| R-7 |    |    |     | 48  |     |     |     |     |     |     |
| R-8 |    | 3  |     |     |     |     |     |     |     |     |
| R-9 |    |    | 0.5 | 0.5 | 0.5 | 0.5 | 0.5 | 0.5 | 0.5 | 0.5 |
| P-1 |    | 3  | 2   | 2   | 2   |     |     |     |     |     |
| P-2 | 3  |    |     |     |     | 2   | 2   | 2   | 2   | 2   |
| C-1 | 2  |    | 1   | 1   | 1   |     | 1   |     |     |     |
| C-2 |    |    |     |     |     | 1   |     |     |     |     |
| C-3 |    |    |     |     |     |     |     | 1   |     |     |
| C-4 |    | 1  |     |     |     |     |     |     | 1   |     |
| C-5 |    |    |     |     |     |     |     |     |     | 1   |
| C-6 |    |    |     |     |     |     |     |     |     |     |
| X-1 |    |    |     |     |     |     |     |     |     |     |
| X-2 |    |    |     |     |     |     |     |     |     |     |
| X-3 |    |    |     |     |     |     |     |     |     |     |
| X-4 |    |    |     |     |     |     |     |     |     |     |
| X-5 |    |    |     |     |     |     |     |     |     |     |

TABLE 1-continued

|  | A1 | A2 | A3 | A4 | A5 | A6 | A7 | A8 | A9 | A10 |
|---|---|---|---|---|---|---|---|---|---|---|
| Geometry | A | A | A | A | A | A | A | A | A | A |
| Defect | a | b | a | a | a | a | a | a | b | b |
| LER | 4 | 4.9 | 4.4 | 4.2 | 3.7 | 3.3 | 3.2 | 3.7 | 3.9 | 4.1 |

TABLE 2

|  | A11 | A12 | A13 | B1 | B2 | B3 | B4 | B5 | B6 | B7 |
|---|---|---|---|---|---|---|---|---|---|---|
| R-1 |  |  |  |  |  |  |  |  |  |  |
| R-2 | 48 | 48 |  |  |  |  |  |  | 48 | 48 |
| R-3 |  |  | 95 |  |  |  |  |  |  |  |
| R-4 | 48 | 48 |  | 95 | 95 | 95 | 95 | 95 | 48 | 48 |
| R-5 |  |  |  |  |  |  |  |  |  |  |
| R-6 |  |  |  |  |  |  |  |  |  |  |
| R-7 |  |  |  |  |  |  |  |  |  |  |
| R-8 |  |  |  |  |  |  |  |  |  |  |
| R-9 |  |  |  |  |  |  |  |  |  | 0.5 |
| P-1 |  |  |  |  |  |  |  |  |  |  |
| P-2 | 2 | 2 | 2 | 3 | 3 | 3 | 3 | 3 | 2 | 2 |
| C-1 | 1 | 1 | 1 |  |  |  |  |  |  |  |
| C-2 |  |  |  |  |  |  |  |  |  |  |
| C-3 |  |  |  |  |  |  |  |  |  |  |
| C-4 |  |  |  |  |  |  |  |  |  |  |
| C-5 |  |  |  |  |  |  |  |  |  |  |
| C-6 |  |  |  |  |  |  |  |  |  |  |
| X-1 |  |  |  | 2 |  |  |  |  |  |  |
| X-2 |  |  |  |  | 2 |  |  |  |  |  |
| X-3 |  |  |  |  |  | 2 |  |  |  |  |
| X-4 |  |  |  |  |  |  |  | 2 |  | 1 |
| X-5 |  | 1 |  |  |  |  |  |  | 1 |  |
| Geometry | A | A | A | A | A | A | B | A | A | A |
| Defect | a | a | b | c | c | c | d | c | c | c |
| LER | 3.5 | 3.8 | 5.1 | 5.4 | 5.1 | 5.1 | 5.6 | 5 | 5.1 | 4.8 |

TABLE 3

|  | A-21 | A-22 | A-23 | A-24 | A-25 | A-26 | A-27 | A-28 | A-29 | A-30 | A-31 | A-32 | A-33 | A-34 | A-35 |
|---|---|---|---|---|---|---|---|---|---|---|---|---|---|---|---|
| R-4 | 73 | 73 | 73 | 73 | 73 | 73 | 73 | 73 | 73 | 73 | 47 | 47 | 47 | 47 | 47 |
| R-8 | 3 | 3 | 3 | 3 | 3 | 3 | 3 | 3 | 3 | 3 | 3 | 3 | 3 | 3 | 3 |
| R-10 |  |  |  |  |  |  |  | 20 |  |  |  |  |  |  |  |
| R-11 | 20 | 20 | 20 | 20 | 20 | 20 | 20 |  |  |  |  |  |  |  |  |
| R-12 |  |  |  |  |  |  |  |  | 20 |  |  |  |  |  |  |
| R-13 |  |  |  |  |  |  |  |  |  | 20 |  |  |  |  |  |
| R-14 |  |  |  |  |  |  |  |  |  |  | 46 | 46 | 46 | 46 | 46 |
| P-1 | 3 |  |  |  |  |  |  |  |  |  |  |  |  |  |  |
| P-2 |  | 3 |  |  |  |  |  |  |  |  |  |  |  |  |  |
| P-3 |  |  | 3 |  |  |  |  |  |  | 3 |  |  |  |  |  |
| P-4 |  |  |  | 3 |  |  |  |  |  |  | 3 |  |  |  |  |
| P-5 |  |  |  |  | 3 |  |  | 3 | 3 | 3 |  | 3 |  |  |  |
| P-6 |  |  |  |  |  | 3 |  |  |  |  |  |  |  | 3 |  |
| P-7 |  |  |  |  |  |  | 3 |  |  |  |  |  |  |  | 3 |
| C-1 | 1 | 1 | 1 | 1 | 1 | 1 | 1 | 1 | 1 | 1 | 1 | 1 | 1 | 1 | 1 |
| Geometry | A | A | A | A | A | A | A | A | A | A | A | A | A | A | A |
| Defect | b | a | a | a | a | a | b | a | a | a | a | a | a | a | b |
| LER | 4.4 | 4.1 | 4.2 | 4.2 | 3.9 | 3.9 | 4.3 | 4.1 | 3.9 | 4.2 | 4.2 | 4.3 | 4.0 | 3.9 | 4.4 |

As is clear from the results shown in the above, the curable composition for imprints, excellent in all of patternability, defect-preventive performance, and line edge roughness, was obtained successfully by using the composition of the present invention.

The present disclosure relates to the subject matter contained in Japanese Patent Application No. 112278/2012 filed on May 16, 2012 and Japanese Patent Application No. 153468/2011 filed on Jul. 12, 2011, which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

The invention claimed is:

1. A curable composition for imprints comprising:
   a polymerizable compound (A) which contains a compound having aromatic group(s) and/or alicyclic hydrocarbon group(s);
   a photo-polymerization initiator (B); and
   a non-polymerizable compound (C) having a weight average molecular weight of 150 to 10,000 and having a polyalkylene glycol structure having at least one terminal hydroxy group, or at least one etherified terminal hydroxy group, and containing substantially no fluorine atom and no silicon atom,
   wherein the non-polymerizable compound (C) contains at least one species selected from the group consisting of polyalkylene glycol, polyalkylene glycol ether and polyalkylene glycol ester, and
   the content of constituents other than the polyalkylene glycol structure in the non-polymerizable compound (C) is 5% by mass or less.

2. The curable composition for imprints of claim 1, containing a (meth)acrylate compound, as the polymerizable compound (A).

3. The curable composition for imprints of claim 1, wherein the polymerizable compound (A) contains a compound having fluorine atom(s) and/or silicon atom(s).

4. The curable composition for imprints of claim 1, containing polypropylene glycol, as the non-polymerizable compound (C).

5. The curable composition for imprints of claim 1, containing substantially no solvent.

6. The curable composition for imprints of claim 1, further containing a surfactant.

7. The curable composition for imprints of claim 1, designed for inkjet process.

8. The curable composition for imprints of claim 1, wherein the polyalkylene glycol structure is a straight chain structure of polyalkylene glycol and the non-polymerizable compound (C) has hydroxyl groups at both terminals of the straight chain structure of polyalkylene glycol.

9. The curable composition for imprints of claim 1, containing a (meth)acrylate compound having fluorine atom(s) and/or silicon atom(s), as the polymerizable compound (A).

10. The curable composition for imprints of claim 1, containing a combination of a (meth)acrylate compound having aromatic group(s) and/or alicyclic hydrocarbon group(s), and a (meth)acrylate compound having fluorine atom(s) and/or silicon atom(s), as the polymerizable compound (A).

11. The curable composition for imprints of claim 1, containing a combination of a (meth)acrylate compound having aromatic group(s) and/or alicyclic hydrocarbon group(s), and a (meth)acrylate compound having fluorine atom(s) and/or silicon atom(s), as the polymerizable compound (A); and polypropylene glycol, as the non-polymerizable compound (C).

12. The curable composition for imprints of claim 1, containing a combination of a (meth)acrylate compound having aromatic group(s) and/or alicyclic hydrocarbon group(s), and a (meth)acrylate compound having fluorine atom(s) and/or silicon atom(s), as the polymerizable compound (A); and a diol type polyalkylene glycol, as the non-polymerizable compound (C).

13. A method of forming a pattern, the method comprising applying the curable composition for imprints described in claim 1 on a base, or on a mold having a fine pattern formed thereon, pressing the mold or the base against the curable composition for imprints, and irradiating the curable composition for imprints with light.

14. The method of forming a pattern of claim 13, wherein the curable composition for imprints is applied on the base, or on the mold by an inkjet method.

15. A pattern obtained by the method described in claim 13.

16. An electronic device comprising the pattern described in claim 15.

17. A method of manufacturing an electronic device comprising the method of forming a pattern described in claim 13.

18. A curable composition for imprints comprising:
    a polymerizable compound (A);
    a photo-polymerization initiator (B);
    a non-polymerizable compound (C) having a polyalkylene glycol structure having at least one terminal hydroxy group, or at least one etherified terminal hydroxy group, and containing substantially no fluorine atom and no silicon atom; and
    a polymerization inhibitor;
    wherein the content of constituents other than the polyalkylene glycol structure in the non-polymerizable compound (C) is 5% by mass or less, and
    the polymerization inhibitor is selected from the group consisting of hydroquinone, p-methoxyphenol, di-tert-butyl-p-cresol, pyrogallol, tert-butylcatechol, benzoquinone, 4,4'-thiobis (3-methyl-6-tert-butylphenol), 2,2'-methylenebis (4-methyl-6-tert-butylphenol), cerium (III) salt of N-nitrosophenyl hydroxylamine, phenothiazine, phenoxazine, 4-methoxynaphthol, 2,2,6,6-tetramethylpiperidine-1-oxyl, 2,2,6,6-tetramethylpiperidine, 4-hydroxy-2,2,6,6-tetramethylpiperidine-1-oxyl, nitrobenzene, and dimethylaniline.

19. The curable composition for imprints of claim 1, wherein the non-polymerizable compound (C) is selected from the group consisting of:
    polyethylene glycol,
    polypropylene glycol,
    mono- or dimethyl ether, mono- or dioctyl ether, mono- or dinonyl ether, mono- or didecyl ether, monostearate, monooleate, monoadipate, or monosuccinate of polyethylene glycol, and
    mono- or dimethyl ether, mono- or dioctyl ether, mono- or dinonyl ether, mono- or didecyl ether, monostearate, monooleate, monoadipate, or monosuccinate of polypropylene glycol.

20. The curable composition for imprints of claim 18, wherein the non-polymerizable compound (C) is selected from the group consisting of:
    polyethylene glycol,
    polypropylene glycol,
    mono- or dimethyl ether, mono- or dioctyl ether, mono- or dinonyl ether, mono- or didecyl ether, monostearate, monooleate, monoadipate, or monosuccinate of polyethylene glycol, and
    mono- or dimethyl ether, mono- or dioctyl ether, mono- or dinonyl ether, mono- or didecyl ether, monostearate, monooleate, monoadipate, or monosuccinate of polypropylene glycol.

* * * * *